United States Patent [19]

Troy

[11] Patent Number: 4,796,259
[45] Date of Patent: Jan. 3, 1989

[54] GUIDED PROBE SYSTEM AND METHOD FOR AT-SPEED PC BOARD TESTING

[75] Inventor: Frederick M. Troy, Phoenix, Ariz.

[73] Assignee: Genrad, Inc., Concord, Mass.

[21] Appl. No.: 53,158

[22] Filed: May 21, 1987

[51] Int. Cl.$^4$ ............................................. G01R 31/28
[52] U.S. Cl. ................................... 371/20; 324/73 R; 324/73 AT; 371/1; 371/25
[58] Field of Search ............................ 371/1, 20, 25; 324/73 R, 73 AT

[56] References Cited

U.S. PATENT DOCUMENTS

| | | | |
|---|---|---|---|
| 4,139,147 | 2/1979 | Franke | 324/73 R X |
| 4,194,113 | 3/1980 | Fulks et al. | 371/20 |
| 4,574,354 | 3/1986 | Mihalik et al. | 371/25 X |
| 4,709,366 | 11/1987 | Scott et al. | 371/20 |

*Primary Examiner*—Jerry Smith
*Assistant Examiner*—Stephen M. Baker
*Attorney, Agent, or Firm*—Cahill, Sutton & Thomas

[57] ABSTRACT

A guide probe test system for isolating faults in PC boards performs a "variable time domain" analysis by comparing probed data with stored reference data of waveforms of a known good UUT (unit under test) that are augmented by (1) insertion of shift coefficients to compensate for non-synchronization of the probed data with a start event, and (2) insertion of jitter coefficients to compensate for timing variations in the probed data due to allowable component propagation delay tolerances and/or an asynchronous clock. The insertion of the shift and jitter coefficients creates failure ranges within which mismatches of the probed data with the reference data are treated as possible rather than absolute failures. The UUT is partitioned into measurement sets containing nodes with common stimulus and synchronization to allow the analysis to break feedback loops and isolate faulty components. Use of the analysis is disabled when tracking faults across a measurement set and is re-enabled for further probing within a new measurement set. Insertion of shift and jitter coefficients into the stored reference waveform data for each node to produce failure ranges for each transition is accomplished by storing waveform data for that node from a good UUT, and determining the number of clock pulses by which transitions of that waveform may vary for multiple probings of that node, and by probing the corresponding nodes of multiple known good UUTs to determine the number of clock pulses by which each transition of that waveform may vary due to board-to-board variations. The failure ranges are fed to a probabilistic search routine that controls guided probing of the UUT. The system accomplishes at-speed fault isolation of UUTs containing multiple non-synchronized time bases.

47 Claims, 8 Drawing Sheets

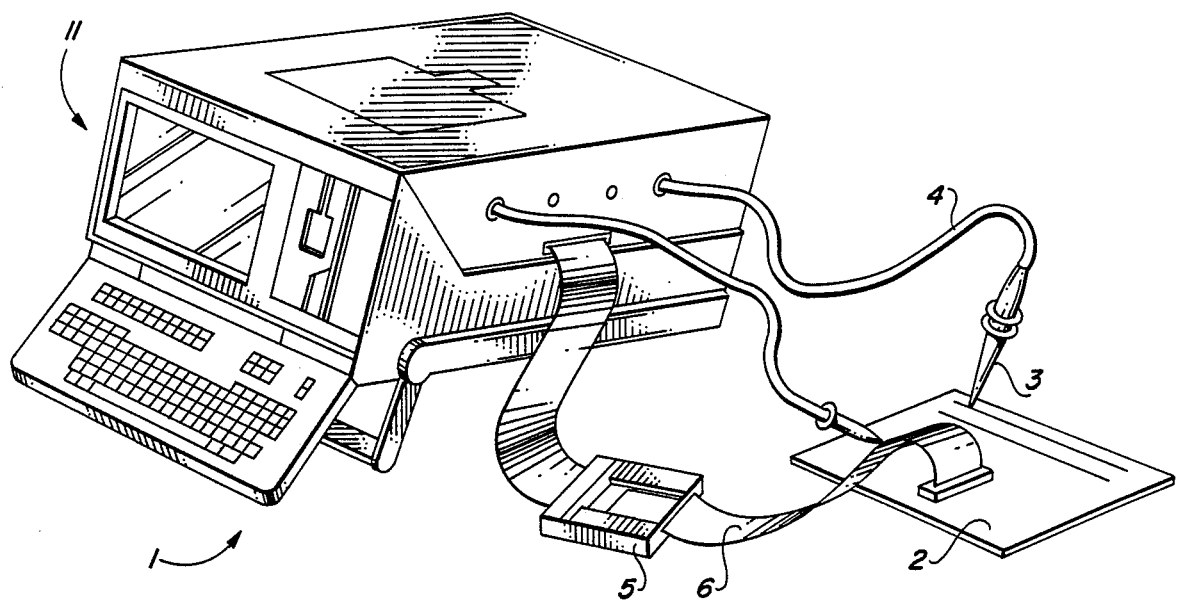
FIG. 1
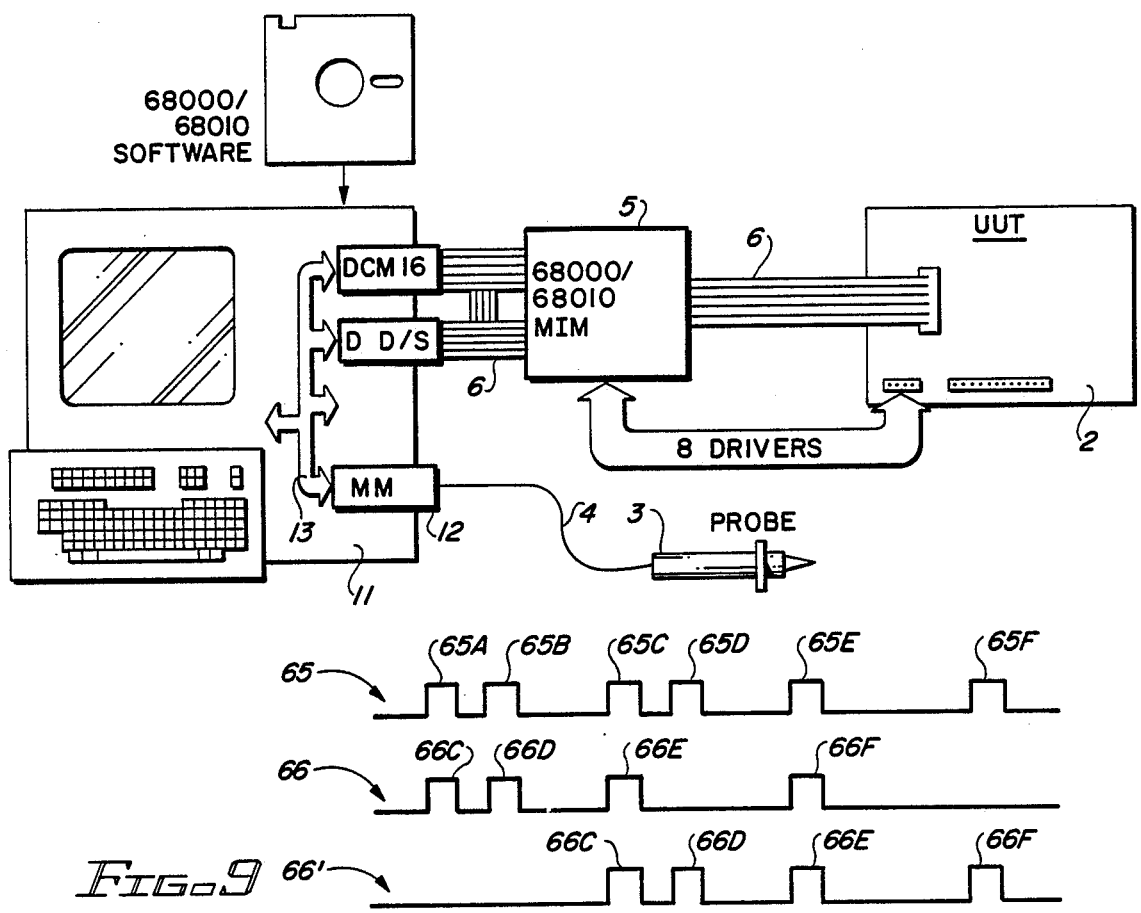
FIG. 1A
FIG. 9

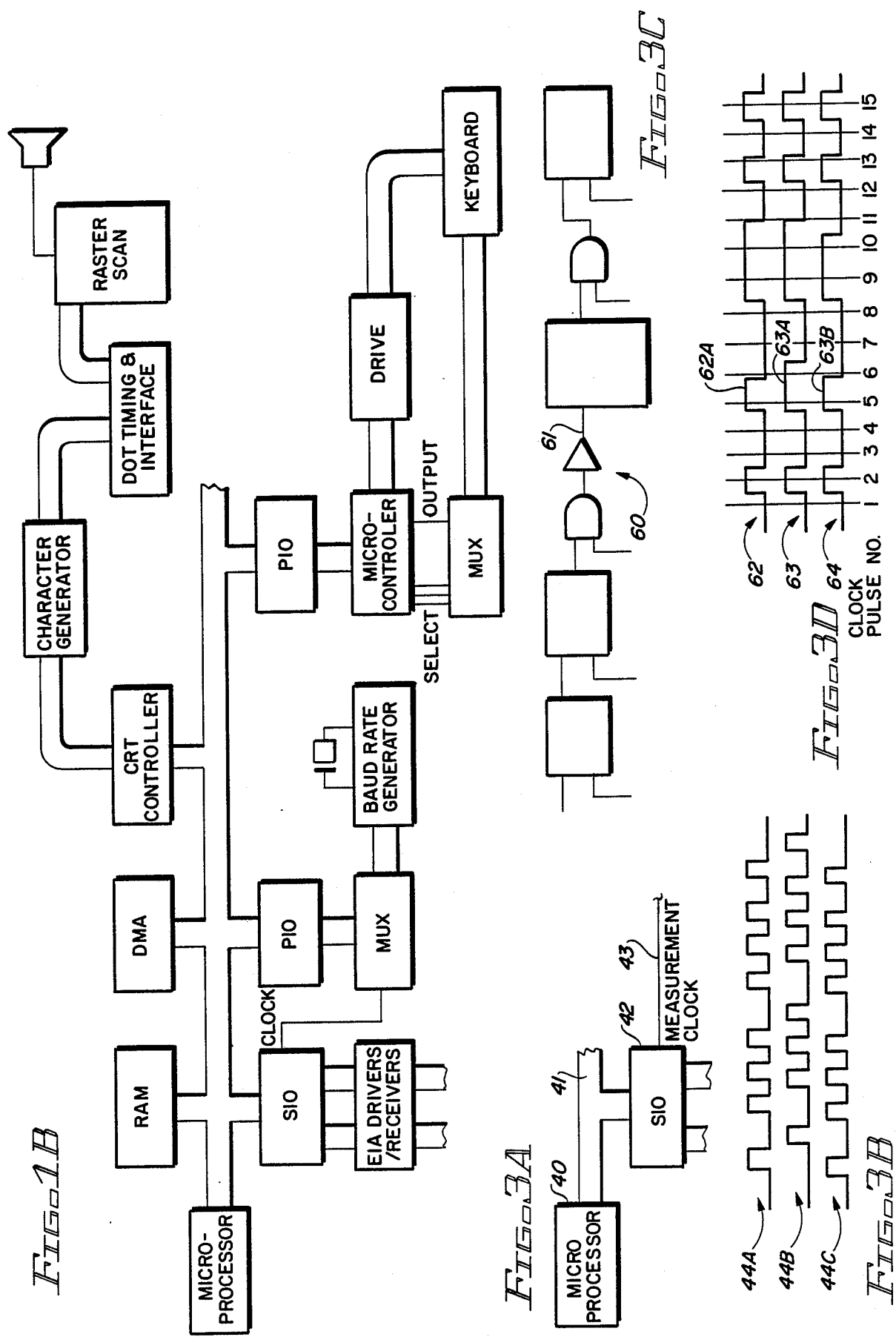

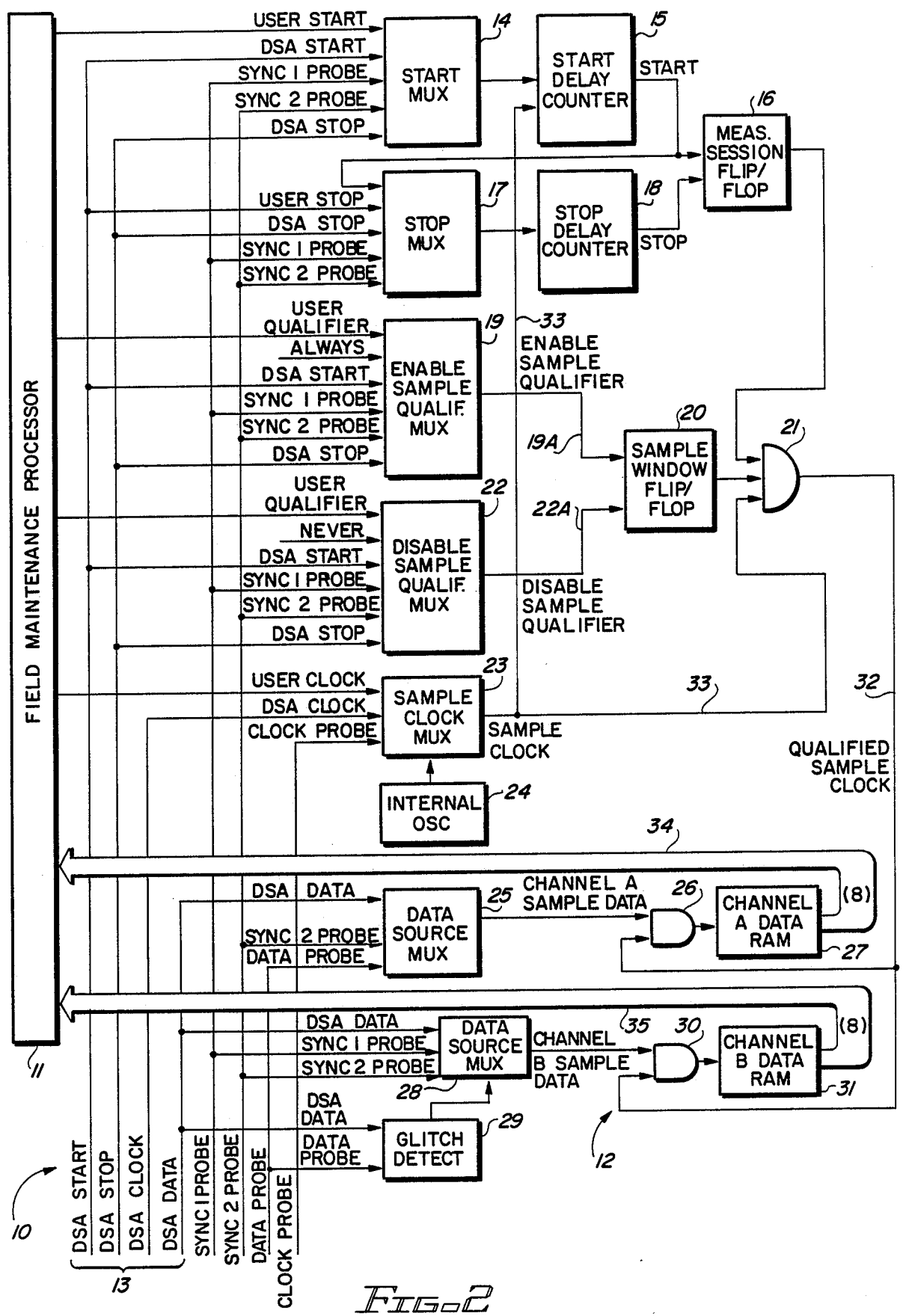

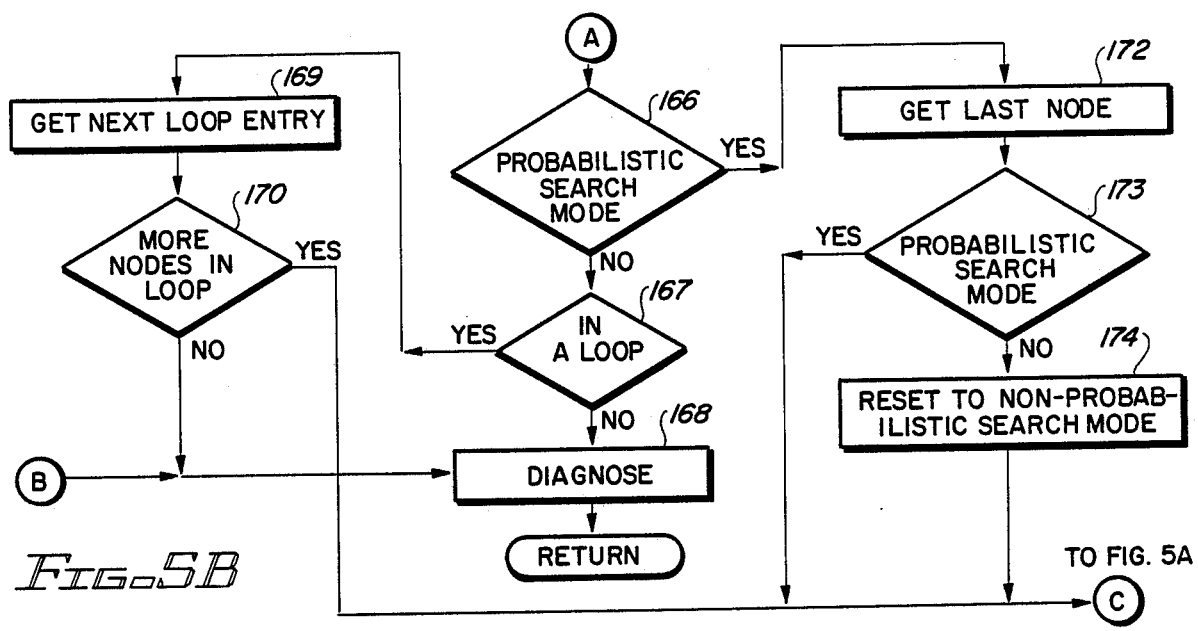
_Fig. 5B_
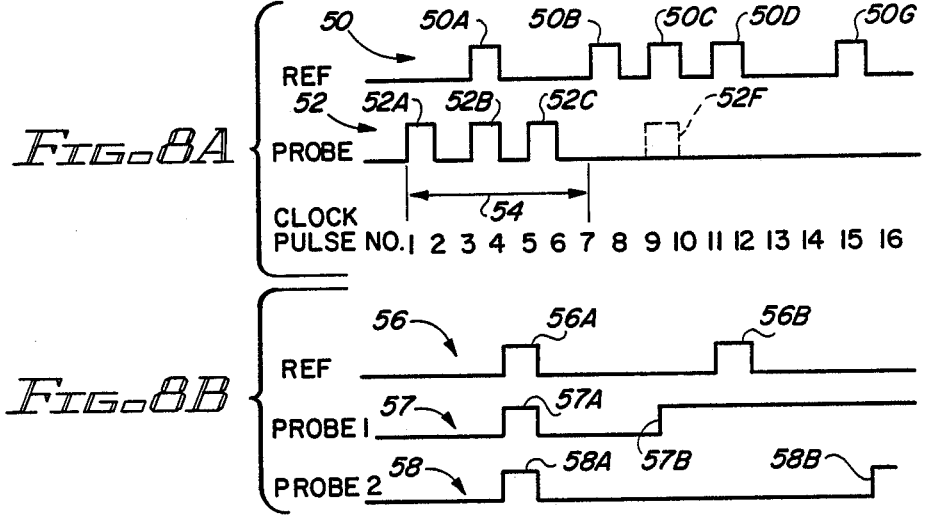
_Fig. 8A_
_Fig. 8B_
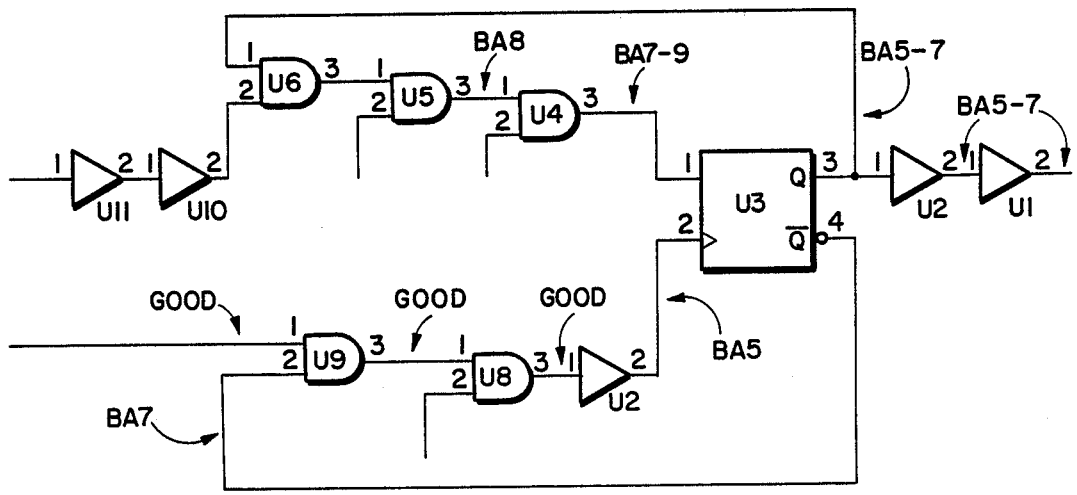
_Fig. 7_

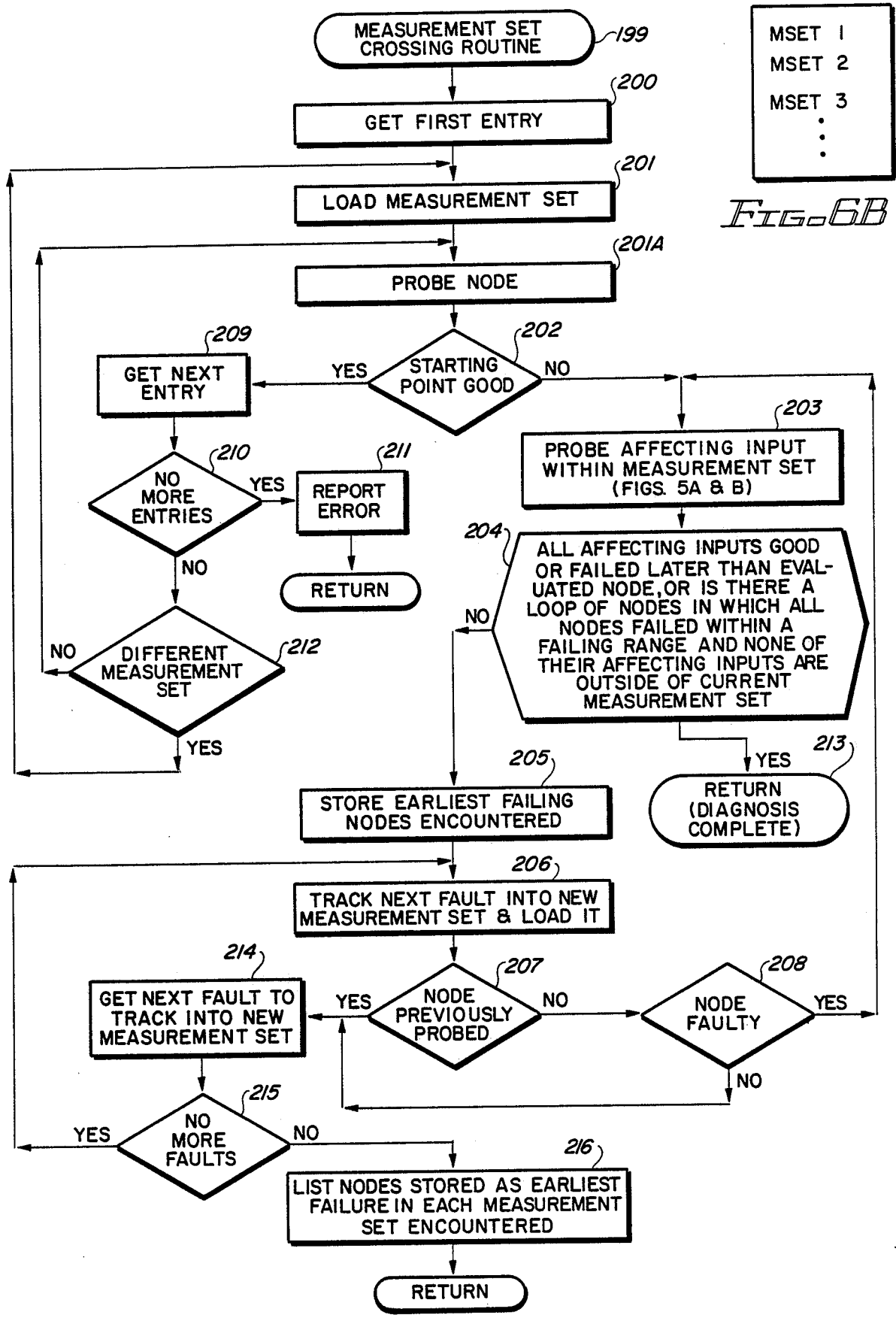

GUIDED PROBE SYSTEM AND METHOD FOR AT-SPEED PC BOARD TESTING

BACKGROUND OF THE INVENTION

The invention relates to functional testers and methods for isolating faults in printed circuit boards, and particularly to guided probe fault isolation of printed circuit boards containing multiple time bases operating at normal speeds in normal environments.

Functional test systems for testing printed circuit boards are well known in the art. In a typical diagnostic system, an operator is prompted to probe a certain node of the UUT. The probed results are compared with stored known good reference waveforms for such nodes, and on the basis of the results of such comparisons, a next affecting input is identified, which the operator then is prompted to probe. The assignee's tester Models GenRad 179X, the TERADYNE L200 and others are illustrative of the state-of-the-art. U.S. Pat. No. 4,194,113 by Fulks et al. also is indicative of the state-of-the-art.

Prior guided probe algorithms typically utilize a technique in which a printed circuit board is probed or "traversed" or "tracked" from a known bad circuit output along a "fault tracking path" toward its inputs in a manner that achieves the greatest depth or "distance" through the circuit, with the fewest probing operations. Beginning with a known failing node, "affecting inputs" are probed to find a faulty affecting input. Once a faulty node is identified in this manner, the probing procedure is repeated for affecting inputs stemming from that faulty node. The probing or "searching" for a defective component terminates when one of two conditions are recognized. The first condition is that if a component is found whose output is faulty and all affecting inputs of that component are correct or fail later than the output, the device is assumed to be faulty. The second condition is that a loop is identified wherein all of the nodes in the loop are bad at the same time and all other affecting inputs of devices in the loop have been probed and found to be correct, or bad at a later time. The nodes in the loop are assumed to be the probable cause of the fault. The foregoing technique has led to excellent results in guided probe testing of a UUT (unit under test) the synchronization and timing of which is controlled by the tester.

However, as technology has rapidly advanced with printed circuit boards of UUTs containing microprocessors and multiple time bases, the foregoing guided probe measurement concepts have proven inadequate, especially for testing various printed circuit boards running "at-speed" (i.e., at normal operating speed) in the UUT. The prior guided probe test systems are unable to acquire meaningful repeatable probe data under these circumstances.

For example, the typical UUT shown in FIG. 1B illustates the problem. The microprocessor may have a first clock system operating at a first rate. The baud rate generator may operate at yet another speed, as may the character generator and the microcontroller interfacing the keyboard with the main bus. In such systems with multiple clock bases, use of the above-mentioned guided probe techniques containing precise clock times of occurrences of detected failures at each node becomes meaningless for loops that contain components which are clocked by different non-synchronized clock signals. Furthermore, variations in propagation delays of components from board to board can easily exceed a typical clock period of a UUT being operated at-speed.

As a result of inability of known guided probe systems to accurately diagnose UUTs operating at-speed with multiple clock bases, much more time-consuming, expensive test procedures are required. Consequently, the UUTs must be diagnosed "by hand", or else much more effect must be expended on development of test programs to make up for the deficiencies of the prior testers. Either alternative is time consuming and expensive.

Clearly, there is a need for an improved guided probe system that is capable of accurately diagnosing faulty nodes in a unit under test operating at-speed, with a minimum number of probing operations and with minimum complexity of hardware and software, even if multiple time bases are included in the UUT.

SUMMARY OF THE INVENTION

Accordingly, it is an object of the invention to provide a guided probe test system capable of isolating faulty nodes in a digital logic circuit operating at-speed without requiring use of excessively complex test hardware and software.

It is another object of the invention to provide a guided probe system capable of efficiently isolating faults in a UUT operating at-speed with a plurality of time bases.

Briefly described, and in accordance with one embodiment thereof, the invention provides a system for isolating faults in a UUT (unit under test) in which a reference waveform is stored for a first node of a known good circuit that is essentially identical to the UUT in response to a predetermined stimulation, a resulting waveform resulting on the first node of the UUT is measured in response to the predetermined stimulation, and the system attempts to align the measured waveform to the reference waveform by shifting the measured waveform within a first time window or shift plus jitter window. If the attempt is not successful, the first node is indicated as bad, but if the attempt is successful, each of a plurality of successive transitions of the measured waveform that occur within a second time window or jitter window located at each of a plurality of corresponding transitions of the reference waveform, is accepted as good if the alignment attempt is successful. A shift number and a jitter number for the first node are stored with the reference waveform. The shift number represents a maximum likely shift or number of clock times between corresponding transitions of the reference waveform and any measured waveform on the first node of any good UUT, respectively. The jitter number represents the maximum likely variance between times of occurrence of corresponding transitions of any measured waveform on the first node of any good UUT that is stimulated in the same manner. In the described embodiment, an indicator of whether the first state of the reference waveform is stable is stored, and if it is and the measured waveform fails to match the reference waveform at a first clock time, the system reports that the first node of the UUT is bad at the first clock time. If the state of the measured waveform matches that of the reference waveform and if a present transition of the measured waveform is not within a shift plus jitter window at a present transition of the reference waveform, the system determines if the present transition of the measured waveform occurs before the shift plus jitter window, and if it does, the system stores a failure range indicating that the first node is bad at clock times $TR-(S+J)$ to $TR+(S+J)$, where TR, S and J are the clock time of the present transition of the measured waveform, the shift number, and the jitter number, respectively. If the present transition of the measured waveform does not occur before the shift plus jitter window, the system stores a failure range indicating that the first node is bad at clock times $STR-(S+J)$ to $STR+(S+J)$, where STR is the clock time of the present reference waveform. The system shifts the measured waveform to the left or right relative to the reference waveform and tests matching of the state of the measured waveform following the present transition of the shifted measured waveform to the state of the reference waveform following the first transition of hhe reference waveform or vice versa to accomplish the initial alignment. If initial alignment cannot be accomplished within the shift plus jitter window, the first node is reported as bad. If alignment is successful, the system increases a clock counter variable by the clock time of the present transition of the reference waveform and determines if the present transition of the measured waveform is within a jitter window located at the present transition of the reference waveform. If this is the case, the system sets the clock counter variable to the clock time of the present transition of the measured waveform, advances the clock times of the next transitions of the measured waveform and the reference waveform, and increases the clock counter variable by the clock time of the next transition of the reference waveform and determines if the present transition of the measured waveform is within the jitter window located at the present transition of the reference waveform. The system repeats the foregoing procedure until either there are no more transitions of the measured waveform, in which case the first node is reported as good, or until the transition of the measured waveform is found that is not within the jitter window at a corresponding transition of the reference waveform. In the latter case, the system stores the failure range centered about either the present transition of the measured waveform or the present transition of the reference waveform, depending upon which occurs to produce the failure. The system then makes another attempt to align the first transition of the reference waveform to the measured waveform or vice versa by producing further shifting of the measured waveform relative to the reference waveform within the first time window (shift plus jitter).

The results of the foregoing technique for isolating faults at the first node are reported to a calling guided probe or probabilistic search subroutine of the system which identifies or diagnoses the bad node of the UUT having a first failure range or first failure time. In the guided probe subroutine, an affecting input node of the bad node is identified. The probabilistic search subroutine determines if the failure range or failure time is within the first failure range of the initial bad node, and if it is, sets a probabilistic mode variable and labels the present affecting input as the "active" node. The system then executes a diagnose subroutine for the bad node if the probabilistic mode variable is set and all of the affecting input nodes are good or their failure ranges exceed that of the present active node. If there are no more affecting input nodes of the present active node, the probabilistic mode variable is set, the system backtracks to the last node that was labelled as an active node and identifies the next affecting input of the last active node. If the affecting input node has previously been measured, the system sets a loop variable and stores a loop boundary if the probabilistic mode variable is not set and a transition of the subject node occurred within the first failure range, and then attempts to identify another affecting input of the present active node. If the failure range or failure time is within the first failure range and the probabilistic mode variable is set, the system labels the present affecting input as the active node and attempts to find another affecting input of the present active node. In backtracking, the system determines if when the last active node was measured the probabilistic mode variable was set, and if it was, resets that node as the active node and identifies the next affecting input of the newly established active node backtracked to. If all of the affecting input nodes of the present active node are not good or their failure ranges do not exceed that of the last affecting input node measured, then the system resets the present affecting input node as active, and backtracks to find another previously active node. If the failure time or highest value of the failure range of the measured waveform of the present affecting input node is less than the lowest value of the first failure range, the system resets the loop variable, since none of the components in the loop is likely to be the cause of the known bad node, and sets the present affecting input node as active and attempts to identify a next affecting input node.

The probabilistic search subroutine is called by a measurement set crossing routine that assumes the UUT has been partitioned into a plurality of groups of nodes having common stimuli and synchronization and that a plurality of measurement sets, one for each of the groups, has been stored containing reference waveforms and appropriate shift and jitter numbers, etc. for each node. The measurement set crossing routine selects a starting node, identifies the measurement set of that starting node, and loads the measurement set into a computer, and executes a measurement subroutine to test the starting node. If the starting node is good, another possible starting node is selected and measured, and this procedure is repeated until a bad starting node is found. If all affecting input nodes are found to be good or fail later than the bad starting node or a loop has been identified to exist exclusively within that measurement set as a result of executing the probabilistic search and variable time domain subroutines, the diagnosis of the probabilistic search subroutine is complete. If affecting input nodes are found in the present measurement set which identify fault tracking paths leading into other measurement sets, the earliest failing node failure times or failure ranges are stored, and the system tracks the bad starting node into a new eeasurement set, by identifying the measurement set of the affecting input in the new fault tracking path and loads the new measurement set into the computer. The system then determines if that affecting input node previously has been measured or found good, and determines if the bad starting node can be tracked into any other measurement sets, and calls the guided probe or probabilistic search subroutine to obtain failure times or ranges for each node in the various measurement sets into which the fault tracking paths extend. The system then reports the nodes having the earliest failure times or failure range in each measurement set from the known bad node was tracked.

BRIEF DESCRIPTION OF THE DRAWINGS

FIG. 1 is a perspective view of a typical guided probe system in which the present invention is embodied.

FIG. 1A is a block diagram of the system shown in FIG. 1.

FIG. 1B is block diagram of a typical UUT including multiple non-synchronized time bases.

FIG. 2 is a block diagram of a measurement module utilized in implementing the invention.

FIG. 3A is a block diagram of a system useful in explaining the problem of shift that occurs in probing a UUT with multiple time bases.

FIG. 3B is a diagram showing three waveforms useful in describing the problem of shift.

FIG. 3C is a block diagram useful in explaining the problem of jitter of a UUT operating at-speed.

FIG. 3D is a set of waveforms useful in describing the problem of jitter.

FIGS. 5A and 5B constitute a flow chart of a probabilistic search subroutine called by the subroutine of FIGS. 4A–4D in accordance with the present invention.

FIG. 6A is a flow chart of a measurement set crossing routine which calls the subroutine of FIGS. 5A–5B in accordance with the present invention.

FIG. 6B is a diagram of a table of starting points for the measurement set crossing routine of FIG. 6A.

FIG. 7 is a diagram of part of a UUT useful in explaining the operation of the guided probe technique of the present invention.

FIGS. 8A and 8B are diagrams of waveforms useful in explaining the operation of the present invention.

FIG. 9 is a diagram of waveforms useful in explaining the operation of the invention.

DETAILED DESCRIPTION OF THE PREFERRED EMBODIMENT OF THE INVENTION

Figure 4A:
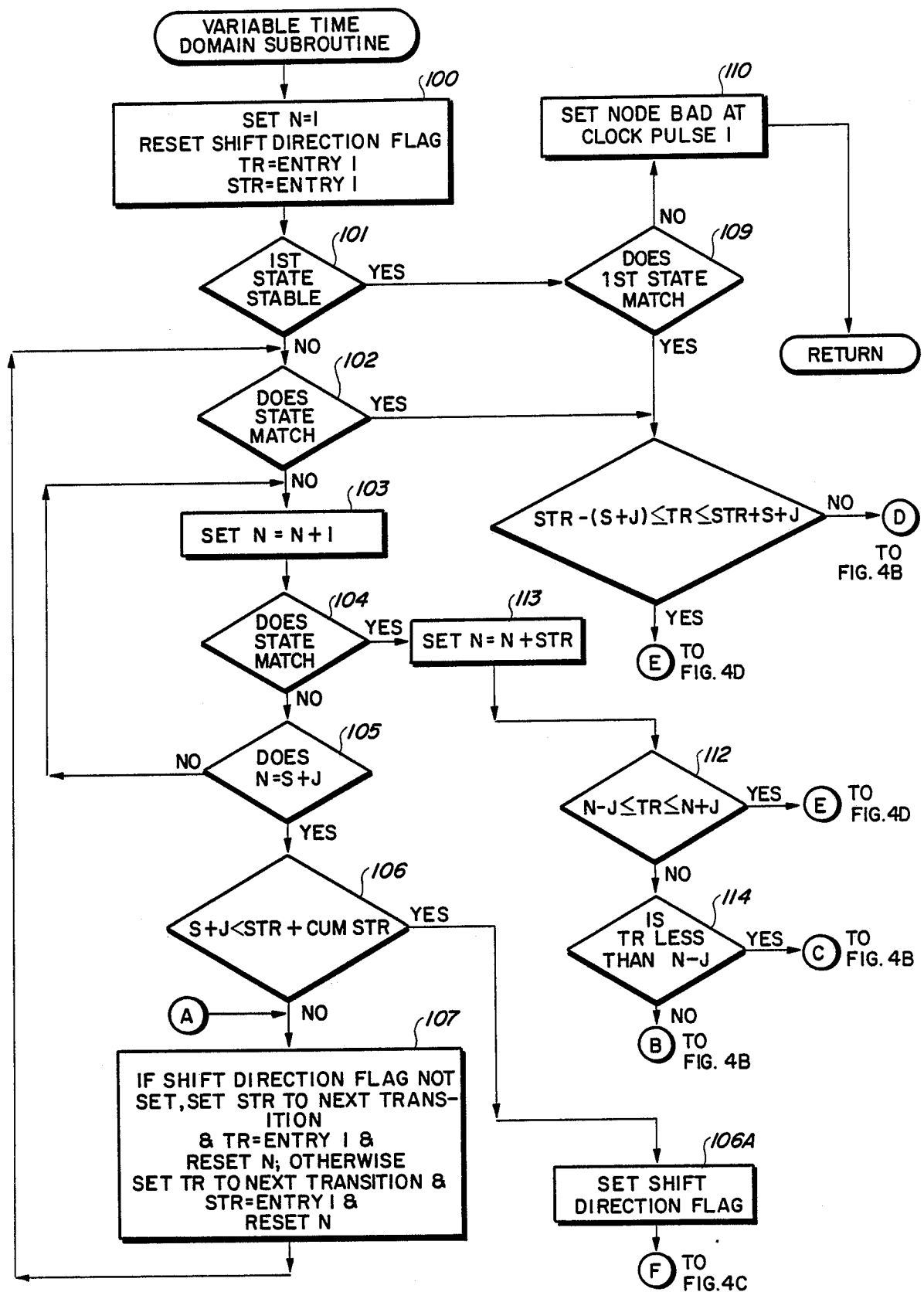
FIGS. 4A–4D constitute a flow chart of a variable time domain subroutine utilized in accordance with the present invention.
Figure 4B:
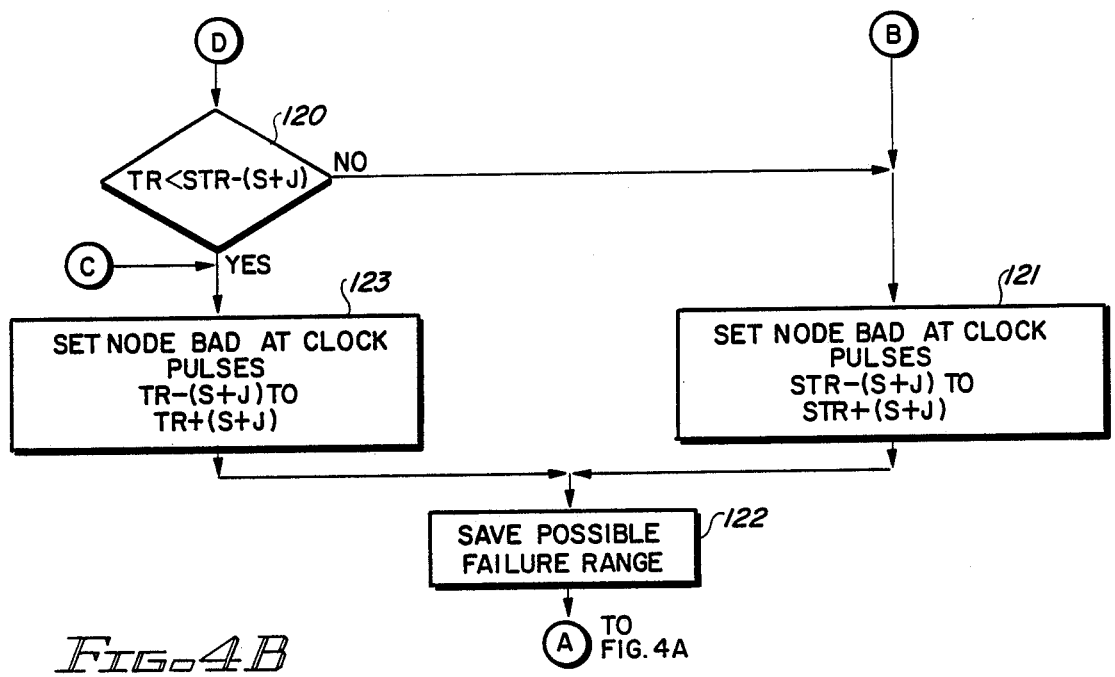

Referring to FIGS. 1 and 1A, reference numeral 1 designates a field maintenance processor 11 (which can be the assignee's GenRad Model 2610 or 2620 test system), a UUT (unit under test) 2, a guided probe unit 3 connected by a coaxial cable 4 to the field maintenance processor's measured module 12, and a microprocessor interface module 5 connected between a field maintenance processor and a particular connector of the UUT by a cable 6. As indicated in FIG. 1A, measurement module 12 is connected between an internal DSA bus 13 of field maintenance processor 11 and the cable 4 of guided probe 3.

As explained above, modern complex bus-structured microprocessor-based systems have proven difficult to test using prior testers. A microprocessor emulation-measurement system developed by the assignee permits measurements to be taken "at-speed" without interrupting the operation of the system under test, and allows synchronization of UUT signal activity with the tester. The microprocessor emulation approach allows an entire UUT to be exercised without disrupting its normal operation. During emulation of UUTs with socketed microprocessors, the microprocessor of the UUT is removed, inserted into the measurement interface module 5 of the test subsystem, and the test subsystem is plugged into the microprocessor socket, or if the UUTs have soldered-in microprocessors, the test system clips onto the microprocessor and overdrives critical microprocessor signals. Using these techniques, the emulation system allows "target" routines (i.e., user-written assembly-level test routines) to be mapped anywhere within the UUT's address space, for example, on 1 kilobyte boundaries of the user RAM (random access memory). The user thus can generate a program and make it appear to be executed from the UUT's memory space even though the user target routine is stored in a diagnostic RAM of the tester. The mapped target routine has the ability to access all locations in the UUT memory space except for the page in which it is located. Thus, user target routines can be developed to work in conjunction with other user resident routines. This mapping capability also allows the user to map a targe routine for RAM testing into different pages, so that all user RAM can be tested.

Referring now to FIG. 2, reference numeral 10 designates an arrangement in which the field maintenance processor 11 of FIGS. 1 and 1A is connected to the measurement module 12 shown in FIG. 1A. The diagram shows fourcconductors 13 of a DSA (device specific adaptor) bus 13 carrying DSA START, DSA STOP, DSA CLOCK, and DSA DATA signals, respectively, from a device specific adaptor circuit that interfaces between the field maintenance processor and the unit under test. As those skilled in the art know, interfacing a general purpose microcomputer such as field maintenance processor 11 to a wide variety of digital systems or UUTs which need to be tested requires construction of a variety of corresponding suitable circuits referred to as "device specific adapters" (DSAs)to facilitate connection and processing of the UUT's signals to the field maintenance processor.

In FIG. 2, a start multiplexer 14 which is programmable by field maintenance processor 11 has its inputs connected to a USER START conductor, a DSA START conductor, a SYNC 1 PROBE conductor, a SYNC 2 PROBE conductor, and a DSA STOP conductor. Start multiplexer 14 has an output connected to an input of a start delay counter 15, the output of which is connectd to apply a START signal to the set input of a "measurement session" flip-flop 16. The output of measurement session flip-flop 16 is connected to one input of a three-input AND gate 21, the output of which prodces a QUALIFIED SAMPLE CLOCK on conductor 32.

A stop multiplexer 17, also programmable by field maintenance processor 11, has one of its inputs connected to the START conductor that is connected to the output of start delay counter 15. The other inputs of stop multiplexer 17 are connected to a USER STOP conductor connected to the field maintenance processor 11, the DSA STOP conductor, the SYNC 1 PROBE conductor and the SYNC 2 PROBE conductor, respectively. The selected input signal is connected from the output of stop multiplexer 17 into the input of a stop delay counter 18, the STOP output of which is connected to the reset input of measurement session flip-flop 16.

The clock inputs of start delay counter 15 and stop delay counter 18 are connected to a SAMPLE CLOCK conductor 33.

An enable sample qualifier multiplexer 19, which also is programmable by field maintenance processor 11, has its inputs connected to a USER QUALIFIER conductor connected to field maintenance processor 11, an ALWAYS conductor connected to a logical "0" level, the DSA START conductor, the SYNC 1 PROBE conductor, the SYNC 2 PROBE conductor, and the DSA STOP conductor, respectively. The output of enable sample qualifier multiplexer 19 is connected by an ENABLE SAMPLE QUALIFIER conductor 19A to the set input of a "sample window" flip-flop 20, the output of which is connected to another input of three-input AND gate 21.

A disable sample qualifier multiplexer 22 has its inputs connected to a USER QUALIFIER conductor connected to field maintenance processor 11, a NEVER conductor connected to a logical "1" level, the DSA START conductor, the SYNC 1 PROBE conductor, the SYNC 2 PROBE conductor, and the DSA STOP conductor, respectively. The output of disable sample qualifier multiplexer 22 is connected to the reset input of sample window flip-flop 20 by a DISABLE SAMPLE QUALIFIER conductor 22A.

The output of a sample clock multiplexer 23 is connected to the SAMPLE CLOCK conductor 33. The inputs of sample clock multiplexer 23 are connected to a USER CLOCK conductor connected to field maintenance processor 11, the DSA CLOCK conductor, the CLOCK PROBE conductor, and the output of an internal oscillator circuit 24 that is programmable by the field maintenance processor to generate clock signals having various selected frequencies, providing the user with a good deal of flexibility in selecting the SAMPLE CLOCK signal frequency.

A data suurce multiplexer 25 has its inputs connected to the DSA data conductor, the SYNC 2 PROBE conductor, and the DATA PROBE conductor, respectively. Multiplexer 25 has its output connected by a CHANNEL A SAMPLE DATA conductor to one input of two-input AND gate 26, the other input of which is connected to QUALIFIED SAMPLE CLOCK conductor 32. The output of AND gate 26 is connected to a CHANNEL A DATA RAM 27, which can be an ordinary 16 kilobit random access memory. CHANNEL A DATA RAM is actually configured as a 16 kilobit shift register with optional data wrap-around from its output to its input. The output of data RAM 27 is connected by 8 bit bus 34 to the DSA bus 13 of field maintenance processor 11.

A data source multiplexer 28 has its inputs connected to the DSA DATA conductor, the SYNC 1 PROBE conductor, the SYNC 2 PROBE conductor, and the output of a glitch detector circuit 29, respectively. The glitch detector circuit 29 can be a conventional circuit capable of detecting the presence of more than one transition within a preselected clock period on either the DSA DATA conductor or the DATA PROBE conductor, which are connected to the two inputs of glitch detector circuit 29.

The output of data source multiplexer 28 applies the selected input to one input of two-input AND gate 30 by means of a CHANNEL B SAMPLE DATA conductor. The output of two-input AND gate 30 is fed into the input of CHANNEL B DATA RAM 31, which also is configured as a 16 kilobit shift register having its output connected by conductor 35 to a 8-bit bus 35, which is connected to the DSA bus 13 of field maintenance processor 11. The other input of AND gate 30 is connected to QUALIFIED SAMPLE CLOCK conductor 32.

Various commercially available integrated circuit multiplexers can be used to implement the above multiplexers. Those skilled in the art will recognize that all of the multiplexers shown in FIG. 2 have control inputs coupled to the field maintenance processor 11 that are decoded to determine which of the inputs is multiplexed to the output. For convenience and simplicity, the connections of these control inputs to the field maintenance processor are not shown.

The above-described measurement module 12 is a device specific adaptor (DSA) that provides logic circuitry, timing circuitry, CRC (cyclic redundancy check) signature analysis circuitry (not shown). Using the flexibility allowed by measurement module 12, the user can capture UUT data for use with the guided probe algorithm. The measurement module 12 permits the user to acquire signal activity at each desired node in the UUT at its normal operating speed, allowing detection and isolation of timing-related problems.

For all data collected during operation, a timing or state diagram, the signature (CRC) data, the first transition, and the number of samples taken are displayed on a screen of field maintenance processor 11. The beginning of a "measurement session" is eetermined by the start multiplexer 14. A separate measurement session occurs for each node at which data is collected, whether the data is received from the DATA PROBE 1 conductor, the SYNC 2 PROBE conductor, or the DSA DATA conductor. Each measurement session is initiated by a preselected start event and stopped by a preselected stop event. The start event is selected by start multiplexer 14 from whichever of the USER START, DSA START, SYNC 1 PROBE, SYNC 2 PROBE, or DSASSTOP signals the start multiplexer 14 is programmed for.

The selected start event triggers start delay counter 15, which can be programmed to provide a delay from 0 to approximately 64,000 counts to generate the START signal, which sets measurement session flip-flop 16. When the measurement session for the present node is completed, a stop event selected from the START signal, the USER STOP, the DSA STOP, the SYNC 1 PROBE, and the SYNC 2 PROBE signals triggers stop delay counter 18. After a programmed number of pulses of the SAMPLE CLOCK signal occurs stop delay counter 18 resets measurement session flip-flop 16, ending the measurement session for the present node.

The start delay counter 15 is useful in delaying the START signal in case it is not practical to find a suitable start event from the available inputs of start multiplexer 14. The capability of stop multiplexer 17 to select the START signal and add to it a programmed delay by means of stop delay counter 18 to generate the stop signal allows the user to conveniently establish and synchronize both the start and stop signals of the current measuremnt session from a single convenient start event on one of the inputs of tee start multiplexer 14. Also, the user can select a convenient one of the USER STOP, DSA STOP, SYNC 1 PROBE, and SYNC 2 PROBE signal transitions as the stop event, and if convenient, add to it a predetermined amount of delay in stop delay counter 18 to generate the STOP signal that ends the current measurement session.

It can be seen that three-input AND gate 21 prevents the start signal produced at the output of measurement session flip-flop 16 from initiating the QUALIFIED SAMPLE CLOCK signal on conductor 32 and thereby prevents the data source selected by multiplexers 25aand 28 from being clocked into CHANNEL A DATA RAM 27 and CHANNEL B DATA RAM 31 except during the windows created by the sample window flip-flop 20.

The user of the test system in which the present invention is incorporated can select the SAMPLE CLOCK signal from the four sources connected to the input of sample clock multiplexer 23, to thereby produce the QUALIFIED SAMPLE CLOCK signal on conductor 32, if all three inputs of AND gate 21 are at logical "1"s. Thus, if a "1" is not set into sample window flip-flop 20, the selected (by means of data source muxes 25 and 28) data being probed or otherwise obtained from the present node of the UUT is not sampled.

To begin sampling of the data from the selected DATA PROBE, DSA DATA, or SYNC 2 PROBE signals, the measurement module 12 selecss under user control the desired one of the USER QUALIFIER, ALWAYS, DSA START, SYNC 1 PROBE, SYNC 2 PROBE, and DSA STOP signals to set flip-flop 20 and begin the present sampling window. When it is desired to stop sampling the selected data source, disable sample qualifier multiplexer 22 applies its selected input signal to the reset input of sample window flip-flop 20, disabling three-input AND gate 21. This can be repeated any desired number of times during a particular measurement session, enabling the user to avoid shifting data in the CHANNEL A DATA RAM and to CHANNEL B DATA RAM every clock pulse when no events of interest are expected on the selected data source.

The ALWAYS input of multiplexer 19 and the NEVER input of multiplexer 22, if selected, causes gate 21 to gate the SAMPLE CLOCK signal to conductor 32 during the entire measurement session, if desired.

The architecture described above is especially well suited to acquiring data in an at-speed testing environment. The start, stop and qualification and data signals are received in real time from the UUT. The versatility of the above structure allows the user to easily set up synchronization of measurements for the various measurement sets in testing a particular UUT. The user program can be configured to easily select any desired start event, stop event, sample clock, and various sample windows from the signals available from the field maintenance processor, the four BNC connectors on the front of the measurement module 12, and the four DSA bus conductors 13. The architecture ensures that all measurements taken with the same measurement module 12 setup will be correlated in time, so that the guided probe algorithm can use the time domain information supplied by the subsequently described variable time domain algorithm.

In accordance with the present invention, a technique referred to as a "variable time domain" (VTD) analysis is utilized to compensate the waveform under test (the data captured by the measurement module, hereinafter referred to as the "measured waveform") at a particular probed node of the UUT to indicate whether that node falls within a range of clock times of a stored "reference waveform" (which also was captured by means of the measurement module 12) for the same node of a known good UUT. This technique avoids indications of a waveform being faulty or bad at a particular clock pulse time due merely to problems commonly found in at-speed measurement acquisition, non-synchronization of measured data to a start event (shift) or slight board-to-board variations in signal propagation delays through the same components of various identical boards under test (jitter).

To understand the variable time domain concept of the present invention, a concept of "shift" will be described with reference to FIGS. 3A and 3B. In FIG. 3A, numeral 39 designates part of a UUT having a microprocessor 40 that operates with a first clock signal. Microprocessor 40 is connected by a bus 41 to a serial input-output (SIO) device 42, which operates in conjunction with a second clock signal that is asynchronous to the first. The measurement module captures (i.e., clocks) data synchronized to the measurement clock 43 of the SIO device 42. However, the waveform at a particular test node in SIO device 42 may be shifted relative to the measurement clock differently for successive measurements because the waveform depends upon the start signal to the measurement module 12 from the processor's execution, which is asynchronous to the measurement module sample clock. For example, at the measured node three consecutive measurements may result in three waveforms 44A, 44B, and 44C in FIG. 3B. These three waveforms are identical except that each is shifted differently relative to the measurement clock 43. These shifts are due entirely to random variations in the asynchronous relationship between the clock of microprocessor 40 and the measurement clock of SIO device 42.

As used herein, the term "shift" (S) is a maximum number of clock pulses that a pulse of a measured waveform may start either earlier or later than the corresponding pulse of the stored reference waveform.

In accordance with the present invention, measurements of a waveform which fall within a window defined by the amount of shift are accepted as correct in order to avoid the possibility that a good measurement is interpreted as bad due merely to asynchronous shift between the measured waveform and the stored reference waveform.

Next, the concept of jitter is described with reference to FIGS. 3C and 3D. These diagrams illustrate the use of "jitter coefficients" to compensate for propagation delay variances. Jitter coefficients also can be used to compensate for asynchronous measurements or to compensate for the condition wherein clock-to-date relationships do not meet the required measurement system set up requirements. Numeral 60 designates a group of components on the UUT. Each of the components has a signal propagation delay associated therewith, and such signal propagation delays have a specified tolerance or variation, so the signal delay of the waveform at a particular node under test, for example, node 61, may vary from one UUT to another, even though overall circuit operation is fault free for both UUTs.

In order to avoid the guided probe measurement system from accidentally interpreting a waveform measurement at node 61 erroneously due to such board-to-board tolerances in component signal propagation delays, or other factors as indicated above, the present invention provides a "jitter window" within which measurements are accepted as correct to avoid an incorrect fault diagnosis.

For circuits running at-speed, such incorrect diagnosis of a fault is quite likely as signal periods approach acceptable component signal propagation delay tolerances. In FIG. 3D, for example, waveforms 62, 63, and 64 represent measured waveforms at nodes 61 of three identical UUTs, respectively. The trailing edge of pulse 62A occurs before clock pulse 6. The trailing edge of pulse 63A occurs after clock pulse 6, and the trailing edge of pulse 63B occurs before clock pulse 6. These differences are due to acceptable within-tolerance variations. If the stored reference waveform has its trailing edge before clock pulse 6, waveform 63 will produce an error if the jitter window of the present invention is not utilized. Similarly, there might be ambiguity in the readings of the pulses of waveforms 62, 63, and 64 immediately at clock pulse 11.

Jitter (J) as defined herein is the maximum number of clock pulses that each data transition of the measured waveform may occur either before or after the position of the corresponding transition in the stored reference waveform with respect to the preceding transition or shift-compensated start event.

In accordance with the present invention, the user "captures" a mid-range reference waveform, and then, on the basis of additional measurements of the corresponding node of various identical UUTs, enters shift and jitter values to create windows or ranges in the stored reference waveform, and variations of measured waveforms that fall within such windows are allowed as good values.

The results of comparing the waveform of a "suspect" node to the reference waveform and its corresponding shift and jitter coefficients is first, a determination if the node is good or bad, and if the node is bad, a range of clock times to indicate when the node first "went bad", i.e., differed from the reference waveform. This information then is used by the guided probe algorithm to track and diagnose a failure, as subsequently explained. Since the shift and jitter coefficients result in a failing range rather than a specific clock time in most cases, the guided probe algorithm will need a "probabilistic search" technique in order to isolate failures, as subsequently explained in more detail.

FIGS. 4A–4D constitute a flow chart of the variable time domain subroutine executed by the test system of FIG. 2 in accordance with the present invention. It should be noted that the variable time domain subroutine of FIGS. 4A–4D is called by the search subroutine of FIGS. 5A–5B, which in turn is called by the measurement set crossing routine of FIG. 6. It is believed that the subroutines should be described in the above-indicated sequence in order to facilitate understanding of the invention.

In FIG. 4A, the variable time domain subroutine enters block 100 and sets a variable N to 1. N by definition is a variable used to designate clock times i.e., at clock 17, 35, etc. In block 100, the subroutine sets a measured waveform transition variable TR equal to a first transition time called ENTRY 1 and sets a reference waveform transition variable STR to a first transition time called ENTRY 1. TR by definition is the clock pulse number of the present transition of the measured waveform. STR is a variable that is equal to the clock pulse number of the transition of the stored reference waveform with which the measured waveform is being compared.

In the presently described embodiment of the invention, TR can have eight values, called ENTRY 1, ENTRY 2, ... ENTRY 8. STR also can have eight values, also called ENTRY 1, ENTRY 2, ... ENTRY 8. The eight saved transitions thus characterize the beginning portions of the saved reference waveform and the measurement waveform being tested, respectively. For each node of the UUT to be tested, the measurement set includes a stored part of the reference waveform for that node "learned" from a known good UUT, including eight saved transitions (STR), an "S coefficient", which is a shift coefficient and a "J coefficient", which is a jitter coefficient, and an indication of whether the first state of the stored reference waveform is stable. The total number of transitions, with a variance, also is included in the measurement set.

The variable time domain subroutine goes from block 100 to decision block 101 and determines if the user has designated the first state of the reference waveform as stable within the shift and jitter window.

If the determination of decision block 101 is affirmative, the subroutine goes to block 109 and determines if the present state (i.e., a logical "1" or a logical "0") of the measured wavefrrm at clock pulse TR is equal to the state of the stored reference waveform at clock pulse number STR. If the initial state is stable, but does not match the initial state of the measurement waveform, the subroutine goes to block 110 and sets a node "status" variable to indicate that the measured waveform of the present node is bad at clock pulse 1, and then returns to the calling subroutine. This provides a fast, high resolution diagnosis of the present node if the first state is supposed to be stable and the first state of the measured waveform does not match it.

If the determination of decision block 109 is affirmative, (i.e., the first state of the measured waveform is correct) the subroutine goes to block 111 and determines if $$STR-(S+J) \leq TR \leq STR+(S+J),$$

i.e., whether the present transition of the measured waveform is within a "shift and jitter window".

If the determination of decision block 111 is negative, the present transition of the measured waveform is not within the shift and jitter window, and this means that the measured waveform is bad at its first transition. The subroutine then goes via label D to decision block 120 of FIG. 4B and determines if the present transition of the measured waveform occurs before it was expected, i.e., before the earliest point of the shift and jitter window. If this determination is affirmative, the subroutine goes to block 123 and sets the node status variable to indicate that the present node is bad during the clock pulses which define the boundaries of the shift and jitter window, i.e., bad at clock pulses $TR-(S+J)$ to $TR+(S+J)$. That is, block 123 the subroutine reports a "failure range" rather than a single failure time.

This failure range then is saved in a "saved failure range table", as indicated in block 122. If the determination of decision block 120 is negative, it means that the present failure occurred because the measured waveform did not undergo a transition when expected. The subroutine enters block 121 and assigns the node status variable to the failure range $STR-(S+J)$ to $STR+(S+J)$, and saves this failure range in the saved failure range table, as indicated in block 122. The subroutine then goes to label A of FIG. 4A, and enters block 107.

At this point, the subroutine has looked at the first transition of th measured waveform and found that it is outside of the shift and jitter window of the stored reference waveform. So now, in block 107, the subroutine begins a procedure to effectively shift the saved reference waveform relative to the present measured waveform, and if a shift direction flag is not set, sets TR equal to ENTRY 1, as before, and sets STR to the next transition, i.e., ENTRY 2, and also resets N equal to 1; if the shift direction flag is set, STR is set to ENTRY 1 and TR is set to the next transition, and N is reset to 1. The subroutine then goes to decision block 102.

If the determination of decision block 101 had been that the first state of the stored reference waveform is not stable, the subroutine would have gone to decision block 102 at that point.

In decision block 102, the subroutine determines if the first state of the measured waveform matches the present state of the stored reference waveform at clock pulse STR. If this determination is negative (and it would be if the subroutine has passed through decision blocks 109, 111, 120, 122, and 107 to get to the present point, since it already would have been determined that the first state of the stored waveform matches the first state of the stored reference waveform in decision block 109, and therefore would not now match the second state of the stored reference waveform) the subroutine goes to block 103 and increments the clock counter N.

The subroutine then goes to decision block 104 and determines if the state of the measured waveform matches that of the stored reference waveform after effectuating shifting the measured waveform by one clock pulse.

If this determination is affirmative, it means that the subroutine has "found" the measured waveform by effectively shifting it a sufficient number of clock pulses in the correct direction to properly align it with the stored reference waveform for the present node being probed. (Of course, the present node does not have to be "probed" in order to obtain data from it, as the data could come from a connector cable or the like instead.) If this is the case, the subroutine goes to block 113 and sets $N=N+STR$. At this point, the subroutine has compensated for the initial shift of the measured waveform relative to the reference waveform. If the determination of decision block 104 is negative, the subroutine goes to block 105 and determines if N is equal to the sum of the shift and jitter coefficients S+J. If this determination is negative, the subroutine returns to block 103 and again increments N. (If the measured waveform is being shifted to the left relative to the reference waveform, N in block 103 acts as a shift counter for the measured waveform. If the measured waveform is being in effect shifted to the right, N acts as a shift counter for the reference waveform, in effect shifting it to the right relative to the measured waveform.)

The above loop, including blocks 103, 104, and 105, is repeated until either the measured waveform has been effectively shifted enough relative to the reference waveform to align the two waveforms or until an affirmative determination is made by decision block 105. If the determination of decision block 105 is affirmative, the subroutine goes to decision block 106 and determines if the sum of STR and the cumulative STR exceeds S+J. The cumulative STR (CUM. STR in block 106) is the number of clock pulses from the beginning of the waveform to the point of the measured waveform currently being evaluated. If the determination of decision block 106 is negative, the subroutine goes to block 107, and if a shift direction flag is not set, sets STR to the next transition (i.e., ENTRY 3 or ENTRY 4, etc.) sets TR to ENTRY 1, and N to 1 and returns to decision block 102. If the shift direction flag is set, TR is set to the next entry, STR is set to ENTRY 1, and N is set to 1 instead.

Figure 4C:
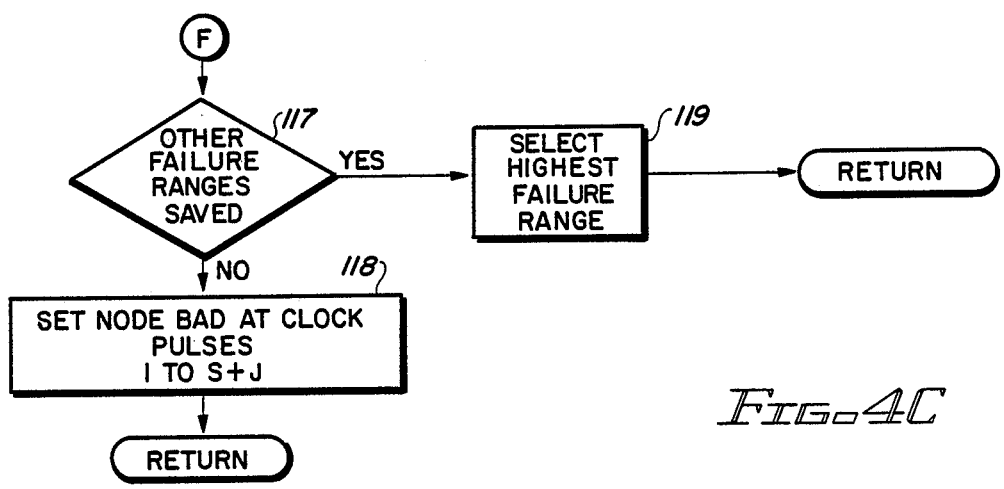
Figure 4D:
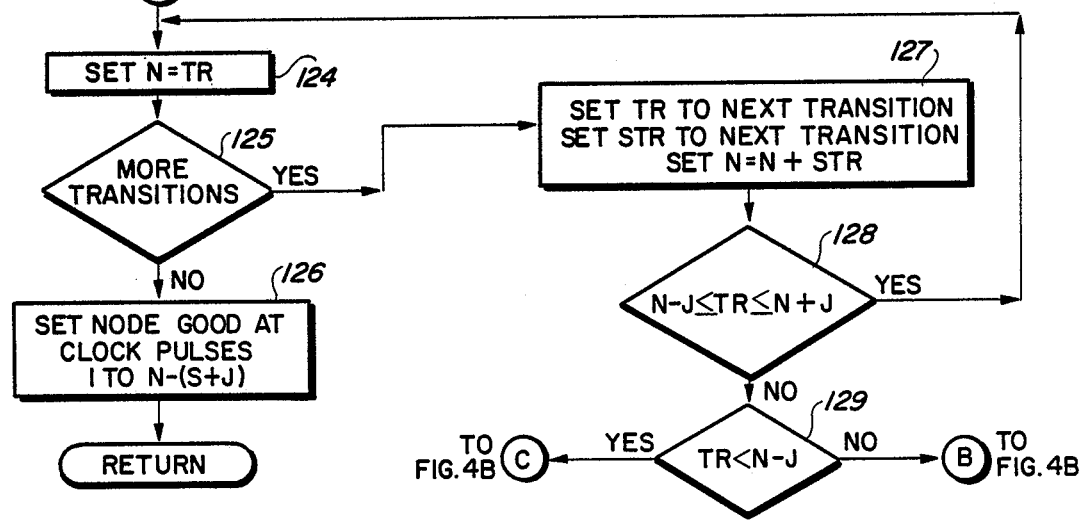

If the determination of decision block 106 is affirmative, this means that all possible matches between the measured waveform to the reference waveform within the shift and jitter window have been attempted, and the subroutine goes to block 106A and sets the shift direction flag, and then goes to block 117 of FIG. 4C via label F, and determines if there have been any failure ranges stored in the failure range table. If this determination is affirmative, the subroutine goes to block 119 and selects and "reports" the highest failure range in the failure range table to the guided probe search routine of FIGS. 5A-5B. The subroutine then returns to the calling routine. If the determination of decision block 117 is negative, this means that no correct match was found between the measured waveform and the stored reference waveform within the shift and jitter window. The subroutine then goes to block 118 and sets the node status to bad at 1 to S+J, and returns to the calling routine.

If the determination of decision block 104 is affirmative, this means that the measured waveform has been aligned with the stored reference waveform for the node being probed, so N is set equll to N+STR.

Next, the subroutine determines if the next transitions of the measured waveform match corresponding transitions of the reference waveform. The subroutine goes to decision block 112 and determines if the clock number of the next transition of the measured waveform is within the allowable range $$N-J \leq TR \leq N+J,$$

i.e., if the next transition of the shifted measured waveform is within the jitter window defined by the jitter coefficient J on either side of the corresponding transition of the stored reference waveform. If this determination is affirmative, the subroutine goes via label E to block 144 of FIG. 4D. However, if the determination of decision block 112 is that the next transition of the measured waveform is outside of the jitter window, the subroutine goes to decision block 114 and determines if the present transition occurs before the beginning of the jitter window. If this is the case, the subroutine goes via label C to block 123 of FIG. 4B and sets the node status to bad at the range defined by the shift plus jitter window about the clock pulse TR, and saves that failure range. If the determination of decision block 114 is negative, the subroutine instead goes via label B to block 121 of FIG. 4B, and sets the node bad range equal to the shift plus jitter window about clock pulse number STR, and saves that in the saved failure range table.

If the determination of decision block 111 or 112 is affirmative, so that the present transition of the measured waveform is within the allowable window about clock pulse STR, this means that the subroutine is ready to compare the remaining transitions of the reference waveform to the measured waveform. If this happens, it means that the subroutine has found a transition of the saved reference waveform that matches the present transition of the measured waveform. The subroutine then goes via label E to block 124 of FIG. 4D. In block 124 the subroutine sets N=TR, i.e., sets the clock counter to the clock number of the present transition. The subroutine then goes to decision block 125 and determines if there are any more transitions of the reference waveform to be matched with the measured waveform. If this determination is negative, the subroutine has not found any mismatches between the measured waveform and the saved reference waveform. The subroutine then goes to block 126 and sets the node status to indicate that the present node has probed good from the initial clock pulse to the clock pulse N−(S+J), and returns to the calling routine.

If there are more transitions of the present measured waveform to be compared with the saved reference waveform, the subroutine goes to block 127 and sets both TR and STR to the next transition or entry, and sets $N=N+STR$, i.e., increments N. The subroutine then goes to decision block 128 and determines if $$N-J \leq TR \leq N+J,$$

i.e., if the present transition of the measured waveform is within the expected jitter range defined by the jitter coefficients. If the determination of decision block 128 is that the present transition falls within the jitter window of the saved reference waveform for the present transition, the subroutine goes to block 124 to check the next transition. If the determination of block 128 is negative, it means that the present transition of the measured waveform occurs prior to the jitter window. If this determination is negative, the subroutine goes via label C to block 123 of FIG. 4B and sets the node status to indicate that the current node is bad in the range $$TR-S+J \text{ to } TR+(S+J),$$

and saves that failure range in the failure range table. If the determination of decision block 129 is negative, the subroutine goes via label B to block 121 of FIG. 4B and sets the current node status to indicate the failure range $$STR-(S+J) \text{ to } STR(S+J),$$

and saves this range in tee failure range table.

If the subroutine gets to this point (block 122) by performing an initial alignment of the measured waveform to the reference waveform to compensate for shift (as defined above), and then attempts jitter compensation in the loop including blocks 1127 and 128 and fails, it is possible that the original shift compensation was incorrect and further shift compensation is required. This situation can occur if a portion of the measured waveform can be aligned with both an early portion and a subsequent portion of the reference waveform, but a larger portion of the measured waveform can only be aligned with the subsequent portion of the reference waveform. FIG. 9 shows an example of how this situation can arise. In FIG. 9, reference numeral 65 designates the reference waveform, and numeral 66 designates the maasured waveform. The VTD subroutine might perform an initia shift compensation by aligning pulses 66C and 66D of measured waveform 66 with pulses 65A and 65B of reference waveform 65, as shown. The subroutine then would go via blocks 113 and 112 to the jitter compensation section including blocks 124, 127 and 128 and eventually determine that no transition of measured waveform 66 falls within the jitter window of the leading edge of pulse 65D of reference waveform 65D. This would cause the subroutine to pass through blocks 129, 121, and 122, and then into 107.

At this point, the subroutine would try to determine if further shift compensation could be achieved, and in the loop including blocks 103, 104, and 105, would shift the measured waveform 66 uurther to the right, as indicated by 66', within the shift plus jitter window, and align pulses 66C and 66D with pulses 65C and 65D of reference waveform 65, as shown. The subroutine then would return to the loop of blocks 124, 125, 127, and 128 and discover that now pulses 66E and 66F of measured waveform (now 66') are aligned with pulses 65E and 65F of reference waveform 65, and report the node good in block 126, instead of bad as in the first pass described above.

The waveforms in FIGS. 8A and 8B may be referred to in order to help illustrate how portions of the variable time domain subroutine of FIGS. 4A-4D operate. In FIG. 8A, reference numeral 50 designates a saved reference waveform for the node of the UUT being probed. Referenc numeral 52 designates the measured waveform at that node from the UUT under test. Note that waveform 52, if shifted to the right by six clock pulses, would be precisely aligned with reference waveform 50. However, a fault would be detected because a pulse designated by dotted lines 52F, which should correspond to pulse 50G of the reference waveform, is missing. Arrow 54 indicates the six clock pulse amount by which the probed or measured waveform 52 must be shifted to the right to be matched with the stored reference waveform in such a way as to identify faults at the node being probed.

In FIGS. 4A-4D, an initial state of reference waveform 50 would be found stable in decision block 101, and in decision block 109 the state of pulse 50A would be found to match the state of pulse 52A of the measured waveform. The subroutine then would go to decision block 111 and would determine that the first transition of waveform 52 is within the shift and jitter window corresponding to the first transition of pulse 50A of reference waveform 50 and pulse 52A of measured waveform 52. A failure would not be detected until decision block 128 of FIG. 4D, when the leading edge of pulse 50B of the reference waveform 50 is being compared to the leading edge of pulse 52B of measured waveform 52.

The subroutine then goes through decision block 129, and determines that TR is less than N−J, and then goes to block 123, records a first failure, and enters block 107 of FIG. 4A via label A. The subroutine then goes from block 107 to decision block 102 and determines if there is a match between waveforms 50 and 52 after waveform 52 has been shifted six clock times to the right. There will be a match between pulses 50B and 52A. Then, waveform 52 is compare with waveform 50 during the clock pulse occurring at the time of pulse 50G, and a mismatch (i.e., TR is outside of the jitter window) will be indicated in decision block 128. For the purpose of this example, it will be convenient to assume that the jitter (J) is one clock pulse; the shift (S) has already been indicated to be six clock pulses. The subroutine then will set the current node status to indicate the probed node is bad at clock pulses 8 (clock pulse 15 minus S+J) to 22 (clock pulse 15 plus S+J), in block 121, and returns to the calling subroutine.

In FIG. 8B, waveform 57 indicates that the measured waveform has a transition 57B that occurs before the STRth clock pulse, which coincides with pulse 56B. The subroutine in FIG. 4B in this case goes to block 123 and reports the current node bad in the range $$TR-(S+J) \text{ to } TR+(S+J).$$

Waveform 58 indicates that a transition does not occur prior to the clock pulse of 56B, but instead occurs later at 58B. In this case, the subroutine goes to block 121 and reports the node bad at the failure range $$STR-(S+J) \text{ to } STR+(S+J).$$

Thus, the variable time domain subroutine of FIGS. 4A-4D attempts to align the measured waveform to the stored reference waveform, and if it succeeds, compares states of the measured waveform to the stored reference waveform, and if matches are found, determines if the corresponding transitions of the measured waveform occur within a jitter window associated with a corresponding transition of the stored reference waveform, and if so, indicates that the node is good up to the corresponding clock pulse. If a mismatch is identified, the failing range is determined to be the point of mismatch with a variance added to allow for the shift and jitter of the measurement, and a further attempt to align the measured waveform to the reference waveform is made by further shifting within the shift plus jitter window.

Next, the probabilistic search subroutine of FIGS. 5A and 5B will be described. This subroutine utilizes the node failure time (such as one produced by a conventional comparison of the measured waveform to the reference waveform at a specific time) or node failure ranges produced by the variable time domain subroutine of FIGS. 4A-4D. In describing the probabilistic search subroutine of FIGS. 5A-5B, it will be convenient to refer to the circuit shown in FIG. 7, which is a logic diagram of a sample UUT. Each component, such as U1, U2, etc. has pin nubbers indicating its outputs and inputs. Failure ranges obtained by probing various nodes in the circuit of FIG. 7 are indicated by arrows pointing to those nodes from VTD (variable time domain) failure ranges expressed as BA5-7, BA7-9, etc. or absolute failure times such as BA8 produced by a conventional compression of the measured waveform to the reference waveform. The probabilistic search subroutine operates upon these failure ranges and times to perform the function of fault isolation to one or more nodes of the UUT.

First, the structure of the probabilistic search subroutine will be described, and then its operation will be described with reference to guided probing of various nodes of the circuit of FIG. 7. The subroutine is entered via label 150 and first goes to block 151, after starting the guided probing operation at a known bad node of the UUT, for example pin 2 of component U1 in FIG. 7, and obtains a next affecting input, if there is one, of the present "active" node, i.e., an input of component U1 in this case.

The subroutine then goes to decision block 152 and determines if there were any more affecting inputs. If there are, the subroutine goes to decision block 153, and if there are not, the subroutine goes via label A to decision block 166 of FIG. 5B. In decision block 153 the subroutine determines if the next affecting input has benn previously probed by the probabilistic search subroutine. If this determination is affirmative, the subroutine goes to decision block 160, but if the next affecting input has not been previously probed, the subroutine goes to block 154 and prompts the operator to probe the next affecting input, and executes the variable time domain subroutine of FIGS. 4A-4D, (if appropriate) which as previously described generates an indication that the present node has probed good, or generates a range of times.

The subroutine then goes to decision block 155 and determines if the affecting input probed good in accordance with the VTD subroutine. If this determination is affirmative the subroutine returns to block 151 and gets the next affecting input, but goes to decision block 156 if the node probed bad.

In decision block 156 the subroutine determines if the failure obtained from probing the affecting input under consideration occurred later than a stored failure range (or specific failure time) of the known bad output at which the probabilistic search is initiated. If this determination is affirmative, the subroutine returns to block 151, because the next affecting node resently being probed could not be the cause of the earlier-occurring failure of the known bad output. If the determination of decision block 156 is negative, the subroutine goes to decision block 157. In block 157 the subroutine determines if the presently probed affecting input failed earlier than or at the time of the lower end of the stored failure range of the known bad node. If this determination is affirmative, the subroutine goes to decision block 163 an determines if the presently probed affecting input failure occurred earlier than the stored failure range of the known bad node. If this determination is affirmative it means thtt the source failure occurred at the present test step or earlier, thus invalidating paths through nodes which failed at a later clock number, and the subroutine goes to block 164 and resets a loop variable indicating that the present affecting node invalidates any previously defined loops, and goes to block 165. If the determination of block 163 is negative, the subroutine goes directly to block 165.

In block 165 the subroutine sets a flag designating the presently probed affecting input as an "active" node to mark the progress of the search, and returns to block 151 to get the next affecting input. If the determination of decision block 157 is negative, it means that the presently probed affecting input is within the stored failure range of the known bad node, and the subroutine goes to decision block 158 and tests a flag to determine if the present search has been set into a probabilistic search mode. If this determination is negative, the subroutine goes to block 159, and sets a probabilistic search mode flag to a "1", and goes to block 165. If the determination of block 158 is affirmative, the search is already set to the probabilistic mode. The subroutine then goes to decision block 171 and determines if all affecting inputs of the present active node are good or their failure ranges are greater than that of the last active node. If the determination of decision block 171 is negative, the subroutine returns to block 165, and then to block 151 to fetch the next affecting input of the new "active" node. Otherwise, the subroutine is ready to diagnose the present known bad node, goes via label B to block 168 of FIG. 5B and calls a "diagnose" subroutine for the present node, and returns to the calling routine of FIG. 6A The diagnose subroutine is not described herein, but is well-known to those skilled in the art. Basically, in a diagnose subroutine, a single node or a group of nodes will be identified as probable faults, and the associated components input pins, and output pins will be identified in a convenient order.

Figure 5A:
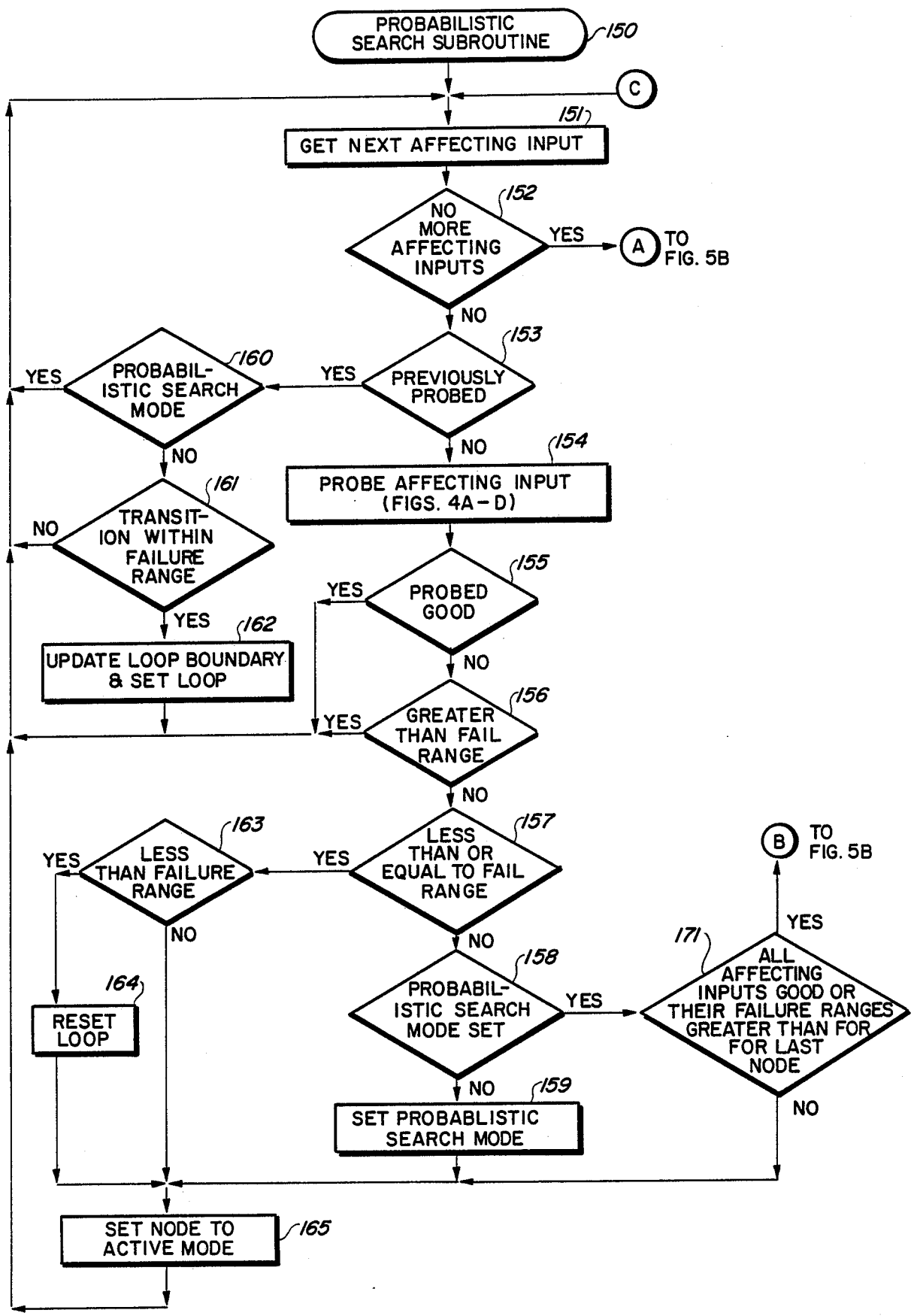

If the determination of decision block 152 is affirmative, the subroutine goes via label A to decision block 166 of FIG. 5B and determines if the present search is in the probabilistic mode. If it is not, the subroutine goes to decision block 167 and tests the loop variable (referred to in blocks 162 and 164) to determine if a feedback loop has been identified. If this determination is negative, the subroutine goes to the diagnose subroutine of block 168, executes it, and returns to the calling routine. If a loop has been identified, the subroutine goes from block 167 to block 169 and fetches the next loop entry, i.e., any node identified in the feedback loop whose affecting inputs have not all been probed. The subroutine then goes to decision block 170 and to determine if there were any more nodes in the loop. If there are no more nodes in the loop, the subroutine goes to the diagnose subroutine. If there are more nodes in the loop, the subroutine goes from block 170 via label C to block 151 of FIG. 5A to get the next affecting input to the loop, i.e., the next affecting input of the present active node.

If the determination of decision block 166 is affirmative, and the search subroutine is in a probabilistic search mode, the subroutine "backtracks" by going to block 172 and fetching the last node probed, and then goes to decision block 173 and determines if the search was probabilistic for that last node. If this determination is affirmative, the subroutine goes via label C to block 151, but otherwise goes to block 174 and resets the search to a non-probabilistic search mode, and then goes via label C to block 151. What is being accomplished here is, as in a loop situation, all affecting inputs of the nodes that wer active along the probabilistic path are being checked.

If the determination of decision block 153 is affirmative, and the affecting input under consideration has been previously probed, the subroutine goes to decision block 160 and determines if the search is probabilistic, and if it is, the subroutine returns to block 151 to get the next affecting input in the loop. If the determination of block 160 is negative, the subroutine goes to decision block 161 and determines if the failing range or failing time of the affecting node presently under consideration is within the stored failure range of the known bad node at which the present search started. If this determination is negative, the subroutine returns to block 151. If the determination of decision block 161 is affirmative, the subroutine goes to block 162 and updates the loop boundary and sets a loop variable indicating that the present node is in a loop, and then returns to block 151 to get the next affecting input.

Blocks 160, 161 and 162 identify the three scenarios that can occur when the surroutine encounters a node that has been previously probed. The first is that the subroutine is performing a probabilistic "backtrack" operation. The second possible scenario is that the subroutine has encountered a circuit loop wherein the failure range or time is not within the lowest encountered failing range (in which can it can be disregarded because the present node cannot be the cause of the failure of the known bad node if the failure range or time of the present node is not within the lowest encountered failing range). The third scenario occurs when the subroutine has identified either an additional loop or a new loop which is defined by more than one node that fails within the lowest encountered failing range.

Next, an example will be given for the operation of the probabilistic search subroutine, assuming that component U2, pin 2 in the circuit of FIG. 7 is known to be bad in the range from clock times 5 to 7. In FIG. 7, a known bad node, U1, pin 2, is bad at clock times 5–7. The probabilistic search subroutine goes to block 151 and gets the next affecting input, which is U2, pin 2. The subroutine determines in block 153 that U2, pin 2 has not been previously probed. The subroutine then prompts the user to probe U2, pin 2, and finds that it is bad at clock times 5–7. Therefore a negative determination is made in block 155 of the search subroutine. The failure range of U2, pin 2 is not greater than the stored failure range of the known bad node U1, pin 2, so the subroutine goes to block 157, and determines that U2, pin 2 is not less than the stored failure range of the known bad node, and goes to block 158, where it determines if the search is set to a probabilistic mode. This determination is negative, so the subroutine goes to block 159 and sets the probabilistic search mode for the present node. The present node is set as an active node in block 165.

The subroutine goes to the next affecting input, which is U3, pin 3. The above procedure is repeated, except that when decision block 158 is reached, the probabilistic search mode is already set, so the subroutine goes to decision block 171, and determines that the failure range of the present node is not greater than that of the last node probed, i.e., that input of U2 did not occur later than its output. The subroutine then goes through block 165 back to block 151 and gets the next affecting input, which is U4, node 3. Its failure range is bad at clock times 7–9, which failure range overlaps the earlier stored failure range, so negative determinations are obtained in blocks 156 and 157. An affirmative determination is obtained in block 158, and a negative determination is determined in block 171.

Next, U5, pin 3 is fetched. When this node is probed, the result is that it is bad at clock time 8, which falls outside of the stored failure range of clock times 5–7, so an affirmative determination is obtained at decision block 156.

Next, the subroutine goes to block 151 and determine if there are any other affecting inputs in this path. It checks U4, pin 2, which presumably probes good, causing the subroutine to return to block 151, and then get an affirmative decision at block 152. An affirmative determination of decision block 152 leads to block 166, where an affirmative determination is obtained because the node was set to the probabilistic mode when U4, pin 3 was probed (i.e., it was determined that U4, pin 3 may or may not have been in the correct path to the actual fault.

The subroutine then backtracks in block 172 by going to the previous node U3, pin 3. This node already has been set in the probabilistic mode (block 173), so the subroutine goes to block 151 and gets the next affecting input for U3, pin 3, and that node happens to be U7, pin 2. It has not been probed before, so it is tested and found to be bad at clock time 5, which is within the stored failure range of the known bad node U1, pin 2.

The guided probing procedure would continue by probing in accordance with block 151, which would get the next affecting input (U8, pin 3). In decision block 153 it would be determined that this node has not been probed before. In blocks 154 and 155 it would be determined that it the node is good. Block 151 and 152 would then determine there are no more effecting inputs. Decision block 166 would determine that the probabilistic mode is not set. Block 167 would determine that there is no loop. Block 168 would diagnose U7, pin 2 as the failing node.

In accordance with the present invention, the algorithm aas the ability to follow a probabilistic search path U4, pin 3, determine that the probabilistic path was not the path to the failure, as determined by probing U5, pin 3 and U4, pin 2. The probabilistic search then terminates, backtracks to U3, pin 3, and finds the correct path, U7, pin 2.

Next, the measurement set crossing routine of FIG. 6A will be described. As mentioned previously, guided probe testing of UUTs with multiple clock bases is very difficult because the precise times of occurrence of failures at various nodes are of critical importance in isolating faults in the UUT, and if the time bases that affect different parts of the circuit are different, it is no longer readily determinable when or where the earliest mismatches with the stored reference waveform occur. The measurement set crossing routine of FIG. 6A deals with this problem by evaluating the results of searches made within the individual measurement sets.

In accordance with the present invention, the UUT is subdivided into sections or sets of nodes that have the same synchronization and the same stimulus. Therefore, the measurement set crossing routine can utilize the subroutines of FIGS. 4A-4D and 5A-5B to probe and evaluate all nodes that are within each measurement set and effectuate manual or automatic loading of other measurement sets for nodes outside of the sealed measurement set for the purpose of tracking along a faulty node path.

The measurement set crossing routine of FIG. 6A begins with an entry from a starting point table, shown in FIG. 6B. Guided probe testing must be initiated at a known bad node. The starting point table enables the measurement set crossing routine to find a first known bad node from which to begin tracking faults along a circuit path in the UUT to identify a bad component or group of components. The subroutine goes from label 199 to block 200 and gets the first entry from the starting point table of 6B. The subroutine then goes to block 201 and loads the measurement eet associated with the first entry, i.e., associated with the first node.

After the associated measurement set is loaded, the system is ready to begin running the stimulus required for guided probe testing. The subroutine goes to block 201A and prompts the user to probe the first node by executing the variable time domain subroutine of FIGS. 5A-5B or a conventional matching subroutine and the variable time domain subroutine of FIGS. 4A-4D. If the first starting point probes good, it is not a bad node at which isolation of a fault in the UUT can begin. The subroutine in this event goes to block 209 and gets the next entry from the starting point table of FIG. 6B, if there are any more entries. The subroutine then goes to decision block 210, determines if there were any more starting point entries, and if there were not, goes to block 211 and reports that no bad starting points have been found in the UUT, and returns to the calling program. Otherwise, the subroutine goes to decision block 212 and determines if the present entry or starting point is included in a different measurement set than the last entry. If this determination is negative, the subroutine iimply goes back to block 201A and prompts the user to probe the node. If the determination of decision block 212 is affirmative, the subroutine goes to block 201 and loads the proper measurement set, and then goes on to block 201A to probe the present starting point.

If a bad starting node is found from which the guided probe fault isolation process can proceed, the determination of decision block 202 is negative, and the subroutine then goes to block 203. In block 203 the subroutine calls the probabilistic search subroutine of FIGS. 5A-5B and effectuates probing of the affecting inputs of the bad starting points found in decision block 202, etc., as previously described. The subroutine then goes to decision block 204 and evaluates the results (the output of the diagnose subroutine). If the diagnosis is determined such that all affecting inputs are good, or failed later than the evaluated node, or a group of nodes are identified that are within a loop wherein none of their other affecting inputs failed within a failing range or none of their other affecting inputs are located outside of the current measurement set, then an affirmative determination is obtained from decision block 204 and the subroutine goes to block 213 because the diagnosis is complete.

If the determination of decision block 204 is negative, it means that the probing (measuring) has identified a fault tracking path that leads out of the present measurement set into another measurement set. The subroutine then goes to block 205 and stores the failure times or failure ranges of the earliest falling nodes encountered in the present measurement set. If the determination of decision block 204 is negative, several things may have occurred. For example, the probabilistic search subroutine, in tracking faults around a loop, may have led to affecting input nodes that fall outside of the present measurement set or, in the process of tracking affecting inputs along a path, may have led to nodes outside of the present measurement set.

The subroutine, after storing the earliest occurring times of failure of nodes in the present measurement set, goes to block 206 and tracks the next fault into the new measurement set by identifying the measurement set associated with the first node encountered in a new measurement set and loading that new measurement set, and then goes to decision block 207. If the determination of decision block 207 is that the present node was previously probed, the subroutine goes to block 214 and gets the next fault (after the next fault of block 206) to track into a new measurement set. Note that paths already followed into the present measurement set should not be followed again. The subroutine then goes to decision block 215 and determines if there are any more fault tracking paths into the present measurement set. If there are more such paths the subroutine returns to block 206 and tracks the next path into its measurement set, loads that measurement set if necessary, and goes back to decision block 207. If the determination of decision block 215 is that there are no more paths the subroutine goes to block 216, and a diagnosis is made that produces a list of the nodes having the earliest failure ranges or times in each measurement set searched.

If the determination of decision block 207 is that the present node was not previously probed in another measurement set, the subroutine goes to decision block 208 and determines if the node is faulty, i.e., if it is probed bad. If this determination is negative, the subroutine goes to block 214, but otherwise the subroutine goes to block 203 and effectuates the probabilistic search of FIGS. 5A-5D, starting with the presently probed node.

The measurement set crossing algorithm of FIG. 6A initiates the probabilistic search routine within a measurement set designated by a starting point. If a definite failure is encountered, that becomes the diagnosis. If the search within the measurement set leads to another measurement set, the process is repeated until either a definite diagnosis is made, or if not, the path through the measurement set is identified by the diagnose subroutine.

The above-described guided probe system solves the problem of diagnosing modern UUTs running at-speed with multiple clocks controlling different portions of the UUT circuitry without extensive circuit analysis hardware having accuracy to within approximately one nanosecond to define and measure points where the activity on the nodes is guaranteed to be stable. Also, test program preparation efforts are reduced greatly by providing diagnostic resolution for multiple clock based UUTs.

To obtain the reference waveforms which are included in the measurement sets, responses are "learned" for groups of nodes having the same stimulus and synchronization. These responses are stored with shift and jitter numbers or coefficients and the corresponding stimulus and synchronization data. Since nodes within a common measurement set have the same clock base, time domain information can be utilized to break feedback loops, and greatly reduces the number of probing operations required within that measurement set. The described guided probe algorithm automatically "enables" use of time domain information when probing within a particular measurement set, disables use of time domain information when crossing into another measurement set, and then re-enables the guided probe algorithm for probing within the new measurement set. The described variable time domain technique separates the variances common in at-speed measurements into shift and jitter categories wherein the user captures a mid-range reference waveform and then manually enters shift and jitter values to produce tolerance windows. Additional measurements may be made within the variable time domain system analyzing the results and determining if they fall within the windows. This technique simplifies the measurement acquisition process. The failure ranges that result from comparisons of nodes measured on a bad UUT to the stored measurement set information result in a failure range being fed to the guided probe algorithm. The guided probe algorithm utilizes a special probabilistic search feature in order to utilize the failing range information to reach a diagnosis.

Start and stop events are easily established without external connections due to the described shift compensation techniques. The measurement range information can be used in conjunction with "conditional connectivity" techniques that allow the programmer to define specific pins as "enable" signals and indicate when, due to the fact that when a component is not enabled, its inputs cannot possibly effect a failing output pin, simplifying the probing operation by allowing the guided probe algorithm to consider only operative, enabled affecting inputs.

The technique for developing a test program for utilizing the above-described guided probe technique for circuit node fault isolation is relatively straightforward. The user develops a stimulus routine to functionally exercise and verify proper operation of the UUT. The first step is to partition the UUT into discrete, testable sections, so that convenient blocks of circuitry can be tested one at a time, allowing faults or failures to be isolated to distinct sections of the UUT. Individual tests are sequenced in a "building block" fashion, so that proper operation of already-tested distinct sections can be relied upon. Measurements for each node affected by the stimulus routines are learned, i.e., measured and stored. For each functional block of the UUT, at least one measurement set will be created. The decision to create multiple measurement sets for a single partition will be based upon the ease of obtaining good repeatable measurements for all nodes in that partition with the same common synchronization (i.e., the same start event, stop event, and clock). When measurements are difficult to attain for all nodes in a particular partition, multiple measurement sets with different synchronization setups should be used.

Next, a representation of the UUT that depicts the interconnection or topology of the devices in a manner in which faults can logically propagate through the UUT is entered. (It should be noted that guided probe topology and connectivity preparation systems are well-known to those skilled in the art, and need not be described in detail herein in order to enable those skilled in the art to practice the invention.) Device models and circuit descriptions can be entered using a standard text editor. Source files are then compiled, and the information is merged into a set of circuit image files that are transferred to a guided probe run time disk. Conventional connectivity libraries can be developed for those devices that repeatedly are found in the UUT. In the case of devices whose connectivity depends upon the manner in which the device is programmed, specific versions of the connectivity models can be designated. Various probe prompt messages, diagnostic messages and no-probe designators or messages can be inserted in the standard data base preparation system, as is well-known to those skilled in the art. A "measurement set cross-reference data base" can be utilized to allow the subroutine of FIG. 6A to automatically cross measurement set boundaries, i.e., to automatically track the fault into the new measurement set and load the new measurement set in block 206 of FIG. 6A. Then, when a fault is tracked to the edge of a measurement set, the test programmer can stipulate a path to continue the probing, or else the guided probe algorithm can automatically track the fault into the adjacent measurement set. The measurement set cross-reference data base assigns for each node a specific measurement set to utilize. This technique allows sections of the UUT that have been found to be fault-free by a go-no-go functional test to be avoided.

While the invention has been described with reference to a particular embodiment thereof, those skilled in the art will be able to make various modifications to the described embodiment of the invention without departing from the true spirit and scope thereof. It is intended that all elements and steps which perform substantially the same function in substantially the same manner to achieve the same result are within the scope of the invention.

I claim:

1. A method of isolating faults in a UUT, comprising the steps of:
   (a) storing a reference waveform produced on a first node of a known good circuit in response to a preselected stimulation of the known good circuit;
   (b) measuring a waveform of the first node of a UUT that is substantially identical to the known good circuit in response to the preselected stimulation thereof;
   (c) attempting to align the measured waveform to the reference waveform by shifting the measured waveform within a preselected first time window;
   (d) if the attempt is not successful, indicating that the first node is bad, and if the attempt is successful, determining if each of a plurality of successive transitions of the measured waveform occur within a preselected second time window located at each of a plurality of corresponding transitions, respectively, of the reference waveform; and (e) if each of the plurality of successive transitions falls within the respective second time windows, accepting the measured waveform as good, and if a transition of the measured waveform does not fall within a corresponding second time window, indicating a failing range for the first node equal to the time of occurrence of the mismatch plus a variance corresponding to the duration of the second time window.

2. The method of claim 1 including repeating steps (a) through (e) for a plurality of other nodes and corresponding other measured waveforms and reference waveforms of the known good circuit and the UUT.

3. The method of claim 2 wherein step (a) includes storing with the reference waveform a shift number representing a maximum likely shift between the reference waveform and any measured waveform on the first node of any good UUT that is substantially identical to the known good circuit and is stimulated by the preselected stimulation.

4. The method of claim 3 wherein step (a) includes storing with the reference waveform a jitter number that represents the maximum likely variance between times of occurrence of transitions of any measured waveform on the first node of any good UUT that is substantially identical to the known good circuit and is stimulated by the preselected stimulation.

5. The method of claim 4 wherein step (a) includes storing an indicator of whether a first state of te reference waveform is stable, and step (c) includes determining if the first state of the reference waveform is stable, and if it is, then determining if at a first clock time the reference waveform matches the measured waveform, and if it does not, reporting that the first node of the UUT is bad at the first clock time.

6. The method of claim 4 wherein step (c) includes, if the state of the measured waveform matches that of the reference waveform, and if a present transition of the measured waveform is not within a shift plus jitter window at a present transition of the reference waveform, determining if the present transition of the measured waveform occurs before the shift plus jitter window, and if it does, storing a failure range indicating the first node is bad at clock times $TR-(S+J)$ to $TR+(S+J)$, where TR, S and J are the clock time of theppresent transition of the measured waveform, the shift number, and the jitter number, respectively.

7. The method of claim 6 wherein step (c) includes storing a failure range indicating the first node is bad at clock times $STR-(S+J)$ to $STR+(S+J)$ if the present transition of the measured waveform does not occur before the shift plus jitter window, where STR is the clock time of the present reference waveform.

8. The method of claim 4 wherein step (c) includes shifting the measured waveform to the right or left one clock time, incrementing a clock counter variable, comparing the state of the measured waveform to the state of the reference waveform, and if the state of the measured waveform does not match that of the reference waveform, incrementing the clock counter variable if the cumulative shifting remains within a shift plus jitter window.

9. The method of claim 8 including if the cumulative shifting exceeds the shift plus jitter window, determining if other failure ranges have been stored, and if they have, reporting the highest stored failure range for the first node, and if no other failure ranges have been stored, reporting that the first node is bad from the initial clock time to the same of the shift and jitter numbers.

10. The method of claim 8 wherein if the state of the measured waveform matches that of the reference waveform after the shifting, increasing the clock counter variable by the clock time of the present transition of the reference waveform, thereby indicating that the measured waveform has been aligned with the reference waveform.

11. The method of claim 10 wherein step (d) includes determining if the present transition of the measured waveform is within a jitter window located at the present transition of the reference waveform, and if it is, (1) setting the clock counter variable to the clock time of the present transition of the measured waveform, and if there are more transitions of the measured waveform, (2) advancing to the clock times of the next transitions of the measured waveform and the reference waveform respectively, and increasing the clock counter variable by the clock time of the next transition of the reference waveform and (3) determining if the present transition of the measured waveform is within the jitter window located at the present transition of the reference waveform, and if it is, repeating steps (1) through (3).

12. The method of claim 11 wherein step (d) includes reporting that the node is good up to the beginning of the jitter window located at the present transition if there are no more transitions of the measured waveform, and if there are more transitions of the measured waveform, and for one of them the measured waveform does not match the reference waveform, storing a range of clock times at which the first node is bad, and returning to step (c) and again attempting to align the measured waveform to the reference waveform by shifting the measured waveform further within the first time window than on the last attempt.

13. The method of claim 12 including, if the present transition of the measured waveform is outside the jitter window of the present transition of the reference waveform, determining if the present transition of the measured waveform occurs before the jitter window of the present transition of the reference waveform, and if it does, reporting that the first node is bad at the clock times $TR-(S+J)$ to $TR+(S+J)$, and if it does not, reporting that the first node is bad at clock times $STR-(S+J)$ to $STR+(S+J)$, where TR is a clock time representative of the present transition of the measured waveform, STR is a clock time representative of the present transition of the reference waveform, S is the number of clock times of the shift number, and J is the number of clock times of the jitter number.

14. A system for isolating faults in a UUT, comprising in combination:
  (a) means for storing a reference waveform produced on a first node of a known good circuit in response to a preselected stimulation of the known good circuit;
  (b) means for providing the preselected stimulation;
  (c) means for measuring a waveform of the first node of a UUT that is substantially identical to the known good circuit in response to the preselected stimulation;

(d) means for attempting to align the measured waveform to the reference waveform by shifting the measured waveform within a preselected first time window;

(e) means for indicating that the first node is bad if the attempt is not successful;

(f) means for determining if each of a plurality of successive transitions of the measured waveform occur within a preselected second time window located at each of a plurality of corresponding transitions, respectively, of the reference waveform if the attempt is successful;

(g) means for accepting the measured waveform as good if each of the plurality of successive transitions fall within the respective second time windows; and (h) means for indicating a failing range for the first node equal to the time of occurrence of the mismatch plus a variance corresponding to the duration of the second time window if a transition of the measured waveform does not fall within a corresponding second time window.

15. The system of claim 14 wherein the storing means includes means for storing with the reference waveform a shift number representing a maximum likely shift between the reference waveform and any measured waveform on the first node of any good UUT that is substantially identical to the known good circuit and is stimulated by the preselected stimulation.

16. The system of claim 15 wherein the storing means includes means for storing with the reference waveform a jitter number that represents the maximum likely variance between times of occurrence of transitions of any measured waveform of the first node of any good UUT that is substantially identical to the known good circuit and is stimulated by the preselected stimulation.

17. The system of claim 16 wherein the storing means includes means for storing an indicator of whether a first state of the reference waveform is stable, and the aligning means includes means for determining if the first state of the reference waveform is stable and if it is then determining if at a first clock time the reference waveform matches the measured waveform, and means for reporting that the first node of the UUT is bad at the first clock time if the reference waveform does not match the measured waveform of the first clock time.

18. The system of claim 17 wherein the aligning means includes means for determining if the state of the measured waveform matches that of the reference waveform if the first state of the reference waveform is stable, means for determining if the present transition of the measured waveform occurs before the shift plus jitter window if a present transition of the measured waveform it not within a shift plus jitter window at a present transition of the reference waveform, the system also including means for storing a failure range indicating the first node is bad at clock times TR−(S+J) to TR+(S+J), where TR, S and J are the clock time of the present transition of the measured waveform, the shift number, and jitter number, respectively, if the present transition of the measured waveform occurs before the shift plus jitter window.

19. The system of claim 18 including means for storing a failure range indicating the first node is bad at clock times STR−(S+J) to STR+(S+J) if the present transition of the measured waveform does not occur before the shift plus jitter window, where STR is the clock time of the present reference waveform.

20. The system of claim 16 wherein the aligning means includes means for shifting the measured waveform to the right or left one clock time, means for incrementing a clock counter variable, means for comparing the state of the measured waveform to the state of the reference waveform, and means for incrementing the clock counter variable if the cumulative shifting remains within a shift plus jitter window and the state of the measured waveform does not match that of the reference waveform.

21. The system of claim 20 including means for determining if other failure ranges have been stored if the cumulative shifting exceeds the shift plus jitter window, means for reporting the highest stored failure range for the first node if the cumulative shifting exceeds the shift plus jitter window, and means for reporting that the first node is bad from the initial clock time to the same of the shift and jitter numbers if no other failure ranges have been stored.

22. The system of claim 20 including means for increasing the clock counter variable by the clock time of the present transition of the reference waveform to indicate that the measured waveform has been aligned with the reference waveform if the state of the measured waveform matches that of the reference waveform after the shifting.

23. The system of claim 22 wherein element (f) includes means for determining if the present transition of the measured waveform is within a jitter window located at the present transition of the reference waveform, means for setting the clock counter index to the clock time of the present transition of the measured waveform if the present transition of the measured waveform is within that jitter window, means for advancing to the clock times of the next transitions of the measured waveform and the reference waveform respectively, and increasing the clock counter variable by the clock time of the next transition of the reference waveform if three are more transitions of the measured waveform, and means for determining if the present transition of the maasured waveform is within the jitter window located to the present transition of the reference waveform.

24. The system of claim 23 including means for reporting that the node is good up to the beginning of the jitter window located at the present transition if there are no more transitions of the measured waveform, and means for storing a range of clock times at which the first node is bad if there are more transitions of the measured waveform and if for one of them the measured waveform does not match the reference waveform, and means for again attempting to align the measured waveform to the reference waveform by shifting the measured waveform further within the first time window than on the last attempt.

25. The system of claim 24 including means for determining if the present transition of the measured waveform occurs before the jitter window of the present transition of the reference waveform if the present transition of the measured waveform is outside the jitter window of the present transition of the reference waveform, means for reporting that the first node is bad at the clock times TR−(S+J) to TR+(S+J) if the present transition of the measured waveform occurs before the jitter window of the present transition of the reference waveform, and means for reporting that the first node is bad at clock times STR−(S+J) to STR+(S+J) if the present transition of the measured waveform does not occur before the jitter window of the present transition of the reference waveform, where TR is the clock time of the present transition of the measure waveform, STR is the clock time of the present transition of the reference waveform, S is the number of clock times of the shift number, and J is the number of clock times of the jitter number.

26. A method of isolating faults in a UUT, comprising the steps of:
  (a) identifying a bad node of the UUT having a first failure range or failure time and labelling the bad node as the present active node by setting the bad node to an active mode;
  (b) if there are more affecting inputs of the active node, identifying an affecting input node of the active node;
  (c) stimulating the UUT and measuring a resulting waveform at that affecting input node and producing a failure range or a failure time for that affecting input node if there is a mismatch of the measured waveform with a known good reference waveform;
  (d) determining if the failure range or failure time is within the first failure range, and if it is, setting a probabilistic mode variable, and labelling the present affecting input as the active node, and repeating steps (b) through (d) for another affecting input node, if there is one, of the present active node;
  (e) if the probabilistic mode variable is set and all of the affecting input nodes are good or their failure ranges exceed that of the active node, executing a diagnose subroutine for the bad node; and
  (f) if there are no more affecting input nodes of the present active node and the probabilistic mode variable is set, backtracking to the last node that was labelled as an active node, and identifying a next affecting input node of that last active node, and repeating steps (c) through (f) for that affecting input.

27. The method of claim 26 including the steps of determining after step (b) if the affecting input node has been previously measured, and if not, going to step (c), and if so, setting a loop variable and storing a loop boundary if the probabilistic mode variable is not set and a transition of that node occurred within the first failure range, and going to step (b) to identify another affecting input node of the present active node.

28. The method of claim 27 wherein if in step (f) the probabilistic search variable is not set, determining if the loop variable is set, and if it is not, executing a diagnose subroutine for the bad node.

29. The method of claim 28 wherein step (f) includes determining if when the last active node was measured the probabilistic mode variable was set, and if it was, setting that node to the active node and identifying the next affecting input, node of that active node, and if the probabilistic mode variable was not set, resetting the probabilistic mode variable for that active node and then identifying its next affecting input node.

30. The method of claim 26 wherein if in step (e) at least one of the affecting input nodes is not good and its failure range does not exceed that of the active node, then setting the present affecting input node to the active mode and returning to step (b) to identify a next affecting input node of the present active node.

31. The method of claim 27 where if the failure time or highest value of the failure range of the measured waveform of the present affecting input node is less than the lowest value of the first failure range, then resetting the loop variable, setting the present affecting input node to an active mode, and returning to step (b) to identify a next affecting input node.

32. A system for isolating faults in a UUT, comprising in combination:
  (a) means for identifying a bad node of the UUT having a first failure range or failure time and means for setting the bad node to an active mode to label it as the present active node;
  (b) means for identifying an affecting input node of the bad node;
  (c) means for stimulating the UUT and means for measuring a resulting waveform at that affecting input node to produce a failure range or a failure time for that affecting input node if there is a mismatch of the measured waveform with a known good reference waveform;
  (d) means for determining if the failure range or failure time is within the first failure range, and means for setting a probabilistic mode variable if the failure range or failure time is within the first failure range;
  (e) means for setting the affecting input node to an active mode to label it as the present active node if the failure range or failure time is within the first failure range, to mark the progress of a path of affecting input nodes being measured through the UUT from the bad node;
  (f) means for executing a diagnose subroutine for the bad node if the probabilistic mode variable is set and the failure range of the present affecting input node exceeds that of the present active node; and
  (g) means for backtracking to the last node that was labelled as an active node if there are no more affecting inputs in the path being measured, and the probabilistic mode variable is set, and means for identifying a next affecting input node of that last labelled active node.

33. The system of claim 32 including means for determining if the affecting input node has been previously measured, means for setting a loop variable and storing a loop boundary if the affecting input node has been previously measured and the probabilistic mode variable is set and a transition of that affecting input node occurred within the first failure range.

34. The system of claim 33 including means for determining whether the loop variable is set if the probabilistic search variable is not set, and means for executing a diagnose subroutine for the bad node if the loop variable is not set.

35. The system of claim 34 wherein the backtracking means includes means for determining if the probabilistic mode variable was set when the last active node was measured, and means for identifying the next affecting input node if the probabilistic mode was set when that last active node was measured, and means for resetting the probabilistic mode variable and then identifying the next affecting input node if the probabilistic mode variable was not set for that last active node.

36. The system of claim 34 including means for setting the previous affecting input node to an active mode.

37. The system of claim 33 including means for resetting the loop variable, setting the present affecting input node to an active mode, and identifying a next affecting input node if the failure time or highest value of the failure range of the measured waveform of the present affecting input node is less than the lowest value of the first failure range.

38. A method of isolating faults in a UUT, comprising the steps of:
   (a) partitioning the UUT into a plurality of groups of nodes having common stimuli and synchronization, respectively;
   (b) producing a plurality of measurement sets for the plurality of groups, respectively;
   (c) selecting a starting node, identifying the measurement set of that starting node, and loading that measurement set into a computer;
   (d) executing a measurement subroutine to measure the starting node;
   (e) if that starting node is good, selecting another starting point and repeating steps (c) through (e), and if the starting node is bad, executing a guided measurement subroutine that begins by making measurements of affecting input nodes of the bad starting node within the present measurement set;
   (f) determining if any set of affecting input nodes are good or fail later than its associated active node or if there is a loop of nodes in which all nodes failed within a failing range and none of their affecting input nodes are outside of the present measurement set, and if so, executing a diagnose subroutine that reports the measurements, and if not, storing the failure times or failure ranges of the earliest failing nodes in the present measurement set;
   (g) after storing the failure times or failure ranges, tracking a bad starting node into a new measurement set by finding an affecting input node of the bad starting node in the new measurement set thereby identifying the measurement set of that affecting input node, and loading the new measurement set into the computer;
   (h) determining if that affecting input node previously has been measured or found good, and if so, determining if the bad starting node can be tracked via another fault tracking path into any new measurement set by finding another affecting input node of the bad starting node in the new measurement set or by following another bad node into another new measurement set, and if so, repeating step (h);
   (i) if that affecting input node has not been previously measured and found bad, executing the guided measurement subroutine to effectuate measurement of the affecting input nodes of that bad starting node within the present new measurement set and repeating steps (f) through (i) for the present new measurement set; and
   (j) determining if there are no more fault tracking paths identified into the present new measurement set or any other new measurement set, and if this is so, reporting the nodes having the earliest failure times or failure ranges in each measurement set in which nodes were measured.

39. A system for isolating faults in a UUT, comprising in combination:
   (a) a computer;
   (b) means for producing a plurality of stimuli to a plurality of partitions of the UUT each including a plurality of groups of nodes responsive to a respective stimulation;
   (c) means for storing a plurality of measurement sets for the plurality of groups, respectively;
   (d) means for selecting a starting node, means for identifying the measurement set of that starting node, and means for loading that measurement set into the computer;
   (e) means for operating the computer to execute a measurement subroutine to measure the starting node;
   (f) means for selecting another starting node if that starting node is good, and means for executing a guided measurement subroutine to make measurements of affecting input nodes of the bad starting node within the present measurement set if the starting node is bad;
   (g) means for determining if any set of affecting input nodes are good or fail later than its associated active node or if there is a loop of nodes in which all nodes failed within a failing range and none of their affecting input nodes are outside of the present measurement set, and means for operating the computer, if this is not the case, to execute a diagnose subroutine that reports the measurements, and otherwise storing the failure times or failure ranges of the earliest failing nodes in the present measurement set;
   (h) means for tracking a bad starting node into a new measurement set by finding an affecting input node of the bad starting node in the new measurement set thereby identifying a fautt tracking path into the new measurement set, and means for identifying the new measurement set of that affecting input node and loading that new measurement set into the computer;
   (i) means for determining if that affecting input previously has been measured or found good, and means for determining if one or more bad starting nodes can be tracked along another fault tracking path into any new measurement set;
   (j) means for executing the guided measurement subroutine to effectuate measurement of the affecting inputs of the bad starting node within the new measurement set if that affecting input node previously has not been measured and found bad; and
   (k) means for determining if there are no more fault tracking paths identified as leading into the present new measurement set or any other new measurement set, and means for reporting the nodes having the earliest failure times or failure ranges in each measurement set in which nodes were measured.

40. A method of isolating faults in a UUT, comprising the steps of:
   (a) storing a reference waveform produced on a first node of a known good circuit in response to a preselected stimulation of the known good circuit;
   (b) measuring a waveform of the first node of a UUT that is substantially identical to the known good circuit in response to the preselected stimulation thereof;
   (c) attempting to align the measured waveform to the reference waveform by shifting the measured waveform within a preselected first time window by effectively shifting the measured waveform to the right or left one clock time, comparing the state of the measured waveform to the state of the reference waveform, and if the state of the measured waveform does not match the state of the reference waveform, then determining if the measured waveform has been shifted to an edge of the first time window, the first time window being located at a transition of the reference waveform; and (d) if the measured waveform has been shifted beyond an edge of the first time window, reporting that the first node is bad during a range of clock times corresponding to the width of the first time window.

41. A system of isolating faults in a UUT, comprising in combination:
   (a) means for storing a reference waveform produced on a first node of a known good circuit in response to a preselected stimulation of the known good circuit;
   (b) means for measuring a waveform of the first node of a UUT that is substantially identical to the known good circuit in response to the preselected stimulation thereof;
   (c) means for attempting to align the measured waveform to the reference waveform by shifting the measured waveform within a preselected first time window, the alignment attempting means including means for effectively shifting the measured waveform to the right or left one clock time, means for comparing the state of the measured waveform to the state of the reference waveform, and means for determining if the measured waveform has been shifted to an edge of the first time window if the state of the measured waveform does not match the state of the reference waveform, the first time window being located at a transition of the reference waveform; and
   (d) means for reporting that the first node is bad during a range of clock times corresponding to the width of the first time window if the measured waveform has been shifted beyond an edge of the first time window.

42. A method of isolating faults in a UUT, comprising the steps of:
   (a) identifying a first node of the UUT having a first failure range;
   (b) if there are any affecting inputs of the first node, identifying a first affecting input node of the first node;
   (c) stimulating the UUT and measuring a resulting waveform at the first affecting input node and producing a failure range or a failure time for the first affecting input node if there is a mismatch of the measured waveform with a known good reference waveform;
   (d) determining if the failure range or failure time of the first affecting input node is within the first failure range, and if it is, identifying the first affecting input as the active node, and repeating steps (b) through (d) for an affecting input node, if there is one, of the present active node;
   (e) if all of the affecting input nodes are good or their failure ranges exceed that of the first node, executing a diagnose subroutine for the first node; and
   (f) if there are no more affecting input nodes of the present active node, backtracking to the last node that was previously identified as the active node, and identifying a next affecting input node of that last active node, and repeating steps (c) through (f) for that affecting input.

43. A system of isolating faults in a UUT, comprising in combination:
   (a) means for identifying a first node of the UUT having a first failure range;
   (b) means for identifying a first affecting input node of the first node if there are any affecting inputs of the first node;
   (c) means for stimulating the UUT and means for measuring a resulting waveform at the first affecting input node to produce a failure range or a failure time for the first affecting input node if there is a mismatch of the measured waveform with a known good reference waveform;
   (d) means for determining if the failure range or failure time of the first affecting input node is within the first failure range, and means for identifying the first affecting input as the active node if the failure range or failure time of the first affecting input node is within the first failure range;
   (e) means for executing a diagnose subroutine for the first node if all of the affecting input nodes are good or their failure ranges exceed that of the first node; and
   (f) means for backtracking to the last node that was previously identified as the active node if there are no more affecting input nodes of the present active node, and means for identifying a next affecting input node of that last active node.

44. A method of isolating faults in a UUT, comprising the steps of:
   (a) partitioning the UUT into a plurality of groups of nodes having common stimuli and synchronization, respectively;
   (b) producing a plurality of measurement sets for the plurality of groups, respectively;
   (c) selecting a bad starting node, identifying the measurement set of that bad starting node, and loading that measurement set into a computer;
   (d) executing a guided measurement subroutine that begins by making measurements of affecting input nodes of the bad starting node within the measurement set;
   (e) determining if any set of affecting input nodes are good or failed later than the associated active node or if there is a loop of nodes in which all nodes failed within a failing range and none of their affecting input nodes are outside of the measurement set, and if so, executing a diagnose subroutine that reports the measurements, and if not, storing the failure times or failure ranges of the earliest failing nodes in the measurement set;
   (f) after storing the failure times or failure ranges, tracking the bad starting node into a new measurement set by finding an affecting input node of the bad starting node in the new measurement set, thereby identifying the measurement set of that affecting input node, and loading the new measurement set into the computer;
   (g) repeating steps (d) through (g) for the present measurement set; and
   (h) determining if there are no more paths identified into the present new measurement set or any other new measurement set, and if this is so, reporting the nodes having the earliest failure times or failure ranges in each measurement set in which nodes were measured.

45. A system for isolating faults in a UUT, comprising in combination:
   (a) a computer;
   (b) means for producing a plurality of stimuli to a plurality of partitions of the UUT each including a plurality of groups of nodes responsive to a respective stimulation;
(c) means for storing a plurality of measurement sets for the plurality of groups, respectively;
(d) means for selecting a starting node, means for identifying the measurement set of that starting node, and means for loading that measurement set into the computer;
(e) means for executing a guided measurement subroutine to make measurements of affecting input nodes of the bad starting node within the measurement set;
(f) means for determining if any set of affecting input nodes are good or fail later than the associated active node or if there is a loop of nodes in which all nodes fail within a failing range and none of their affecting input nodes are outside of the measurement set, and means for operating the computer, if this is not the case, to execute a diagnose subroutine that reports the measurements, and if otherwise storing the failure times or failure ranges of the earliest failing nodes in the measurement set;
(g) means for tracking the bad starting node into a new measurement set by finding an affecting input node of the bad starting node in the new measurement set thereby identifying a fault tracking path into the new measurement set, and means for identifying the new measurement set of that affecting input node and loading that new measurement set into the computer;
(h) means for executing the guided measurement subroutine to effectuate measurement of the affecting inputs of the bad starting node within the new measurement set if that affecting input node previously has not been previously measured and found bad; and
(i) means for determining if there are no more fault tracking paths identified as leading into the new measurement set or any other new measurement set, and means for reporting the nodes having the earliest failure times or failure ranges in each measurement set in which nodes were measured.

46. A method of isolating faults in a UUT, comprising the steps of:

(a) storing a reference waveform produced on a first node of a known good circuit in response to a preselected stimulation of the known good circuit;
(b) measuring a waveform of the first node of a UUT that is substantially identical to the known good circuit in response to the preselected stimulation thereof;
(c) determining if each of a plurality of successive transitions of the measured waveform occur within a preselected time window located at each of a plurality of corresponding transitions, respectively, of the reference waveform; and
(d) if each of the plurality of successive transitions falls within the respective time windows accepting the measured waveform as good, and if a transition of the measured waveform does not fall within a corresponding time window, indicating a failing range for the first node equal to the time of occurrence of the mismatch plus a variance corresponding to the duration of the time window.

47. A system for isolating faults in a UUT, comprising in combination:

(a) means for storing a reference waveform produced on a first node of a known good circuit in response to a preselected stimulation of the known good circuit;
(b) means for providing the preselected stimulation;
(c) means for measuring a waveform of the first node of a UUT that is substantially identical to the known good circuit in response to the preselected stimulation;
(d) means for determining if each of a plurality of successive transitions of the measured waveform occur within a preselected time window located at each of a plurality of corresponding transitions, respectively, of the reference waveform;
(e) means for accepting the measured waveform as good if each of the plurality of successive transitions fall within the respective time windows; and
(f) means for indicating a failing range for the first node equal to the time of occurrence of the mismatch plus a variance corresponding to the duration of the time window if a transition of the measured waveform does not fall within a corresponding time window.

* * * * *